United States Patent
Kidron

(10) Patent No.: US 9,537,913 B2
(45) Date of Patent: Jan. 3, 2017

(54) METHOD AND SYSTEM FOR DELIVERY OF AUDIO CONTENT FOR USE ON WIRELESS MOBILE DEVICE

(71) Applicant: Adam Elia Kidron, Bronx, NY (US)

(72) Inventor: Adam Elia Kidron, Bronx, NY (US)

(73) Assignee: Yonder Music Inc., New York, NY (US)

( * ) Notice: Subject to any disclaimer, the term of this patent is extended or adjusted under 35 U.S.C. 154(b) by 187 days.

(21) Appl. No.: 14/147,322

(22) Filed: Jan. 3, 2014

(65) Prior Publication Data
US 2015/0195315 A1  Jul. 9, 2015

(51) Int. Cl.
*H04L 29/06* (2006.01)
*G06F 17/30* (2006.01)
*H04L 29/08* (2006.01)
*H04W 4/18* (2009.01)

(52) U.S. Cl.
CPC ..... *H04L 65/4069* (2013.01); *G06F 17/30743* (2013.01); *H04L 65/4084* (2013.01); *H04L 65/80* (2013.01); *H04L 67/04* (2013.01); *H04L 67/26* (2013.01); *H04W 4/18* (2013.01)

(58) Field of Classification Search
CPC ...... H04L 65/4069; H04L 67/04; H04L 67/26; G06F 17/30743
See application file for complete search history.

(56) References Cited

U.S. PATENT DOCUMENTS

| | | | | |
|---|---|---|---|---|
| 6,418,421 B1* | 7/2002 | Hurtado | ......... | G06F 21/10 705/51 |
| 6,526,411 B1* | 2/2003 | Ward | ......... | G06F 17/30749 |
| 6,987,221 B2* | 1/2006 | Platt | ......... | G06F 17/30038 700/94 |
| 7,747,620 B2* | 6/2010 | Beaupre | ......... | G06F 17/30766 707/734 |
| 7,756,915 B2* | 7/2010 | Ben-Yaacov | ..... | G06F 17/30026 707/899 |
| 7,783,623 B2* | 8/2010 | Acharya | ......... | G06F 17/30749 707/709 |
| 7,797,446 B2* | 9/2010 | Heller | ......... | G11B 27/002 707/E17.109 |
| 7,958,010 B2* | 6/2011 | Huang | ......... | G06F 17/30864 705/26.7 |

(Continued)

OTHER PUBLICATIONS

International Searching Authority, International Search Report Application No. PCT/US14/70472, mailed Mar. 18, 2015, 1pg.

(Continued)

*Primary Examiner* — Arvin Eskandarnia
(74) *Attorney, Agent, or Firm* — Duane Morris LLP

(57) ABSTRACT

A music service application that can be run on a wireless mobile device enables audio data to be progressively downloaded from a remote server and also enables locally stored data to be played efficiently. Audio content that is relevant to a user is identified and downloaded to the user's mobile device, in some cases with minimal or no effort by the user. Continuous play features ensure that the user can experience an uninterrupted music experience, both in online and offline modes. Social features such as playlists and preferences of other users are leveraged, to provide users with popular music that is relevant to their interests.

22 Claims, 15 Drawing Sheets

(56) References Cited

U.S. PATENT DOCUMENTS

| | | | | |
|---|---|---|---|---|
| 8,090,606 | B2* | 1/2012 | Svendsen | G06F 17/30038 705/7.11 |
| 8,135,773 | B2* | 3/2012 | Stopniewicz | H04N 7/17318 709/203 |
| 8,180,770 | B2* | 5/2012 | Ranasinghe | G06F 17/30743 707/732 |
| 8,344,233 | B2* | 1/2013 | Cai | G10H 1/0058 700/94 |
| 8,495,246 | B2 | 7/2013 | Heller et al. | |
| 2002/0138630 | A1* | 9/2002 | Solomon | G06F 17/30017 709/228 |
| 2002/0194601 | A1* | 12/2002 | Perkes | G06Q 30/02 725/44 |
| 2003/0110503 | A1* | 6/2003 | Perkes | H04N 7/17318 725/86 |
| 2004/0177115 | A1* | 9/2004 | Hollander | G06F 17/30026 709/203 |
| 2006/0021068 | A1* | 1/2006 | Xu | G06F 21/10 726/30 |
| 2006/0069617 | A1* | 3/2006 | Milener | G06F 17/30902 705/14.69 |
| 2006/0173974 | A1* | 8/2006 | Tang | H04L 63/029 709/217 |
| 2006/0239131 | A1* | 10/2006 | Nathan | G11B 19/025 369/30.06 |
| 2007/0014536 | A1* | 1/2007 | Hellman | G11B 27/034 386/259 |
| 2007/0061835 | A1* | 3/2007 | Klein | H04N 7/17354 725/25 |
| 2007/0239611 | A1* | 10/2007 | Blum | G06F 17/30749 705/51 |
| 2008/0077942 | A1* | 3/2008 | MacMillan | G06F 3/04817 719/328 |
| 2008/0209322 | A1* | 8/2008 | Kaufman | G06F 3/0481 715/716 |
| 2008/0228300 | A1* | 9/2008 | Tagawa | G06F 3/16 700/94 |
| 2009/0017860 | A1* | 1/2009 | Cole | H04W 52/0261 455/522 |
| 2009/0056525 | A1* | 3/2009 | Oppenheimber | G06F 17/30743 84/609 |
| 2009/0069911 | A1* | 3/2009 | Stefik | G06F 17/30761 700/94 |
| 2009/0069912 | A1 | 3/2009 | Stefik | |
| 2009/0071316 | A1* | 3/2009 | Oppenheimer | G06F 17/30772 84/609 |
| 2009/0222117 | A1* | 9/2009 | Kaplan | G06Q 30/0601 700/94 |
| 2009/0265369 | A1* | 10/2009 | Hyman | G06F 17/30766 |
| 2009/0313303 | A1* | 12/2009 | Spence | G06F 17/30053 |
| 2010/0169493 | A1* | 7/2010 | Yamakawa | H04L 65/1083 709/227 |
| 2011/0096699 | A1* | 4/2011 | Sakhamuri | H04L 12/1822 370/260 |
| 2011/0207482 | A1* | 8/2011 | Shamma | H04L 12/588 455/466 |
| 2011/0225496 | A1* | 9/2011 | Jeffe | G11B 27/034 715/716 |
| 2011/0314502 | A1* | 12/2011 | Levy | H04N 7/106 725/46 |
| 2012/0124162 | A1* | 5/2012 | Cassidy | G06F 17/30029 709/217 |
| 2012/0131460 | A1* | 5/2012 | Coyle-Gilchrist | G11B 27/034 715/716 |
| 2012/0185488 | A1* | 7/2012 | Oppenheimer | G06F 17/30743 707/748 |
| 2012/0215878 | A1* | 8/2012 | Kidron | G06F 17/30867 709/213 |
| 2012/0290653 | A1* | 11/2012 | Sharkey | H04W 4/023 709/204 |
| 2013/0124584 | A1* | 5/2013 | Otto | G06F 17/30769 707/822 |
| 2013/0205223 | A1* | 8/2013 | Gilbert | H04L 67/02 715/748 |
| 2015/0039369 | A1* | 2/2015 | Chen | H04B 7/26 705/7.19 |
| 2015/0039593 | A1* | 2/2015 | Harrang | G06F 17/30867 707/722 |

OTHER PUBLICATIONS

International Searching Authority, International Search Report Application No. PCT/US14/70481, mailed Mar. 18, 2015, 1pg.

N. Magharei, R. Rejaie, and Y. Guo, "Mesh or multiple-tree: A comparative study of live P2P streaming approaches," in Proc. of IEEE INFOCOM'07, 2007, pp. 1424-1432.

H. Deshpande, M. Bawa, and H. Garcia-Molina, "Streaming live media over peers," Stanford InfoLab, Technical Report 2002-21, 2002.

X. Zhang, J. Liu, B. Li, and T.-S. P. Yum, "CoolStreaming/DONet: a data-driven overlay network for peer-to-peer live media streaming," in Proc. of IEEE INFOCOM'05, 2005, pp. 2102-2111.

X. Liao, H. Jin, Y. Liu, L. M. Ni, and D. Deng, "AnySee: Peer-to-peer live streaming," in Proc. of IEEE INFOCOM'06, 2006, pp. 1-10.

http://blog.pandora.com/faq/index.html Nov. 26, 2005, pp. 1-9.
http://www.spotify.com/int/help/faq/ Mar. 16, 2010, pp. 1-13.

* cited by examiner

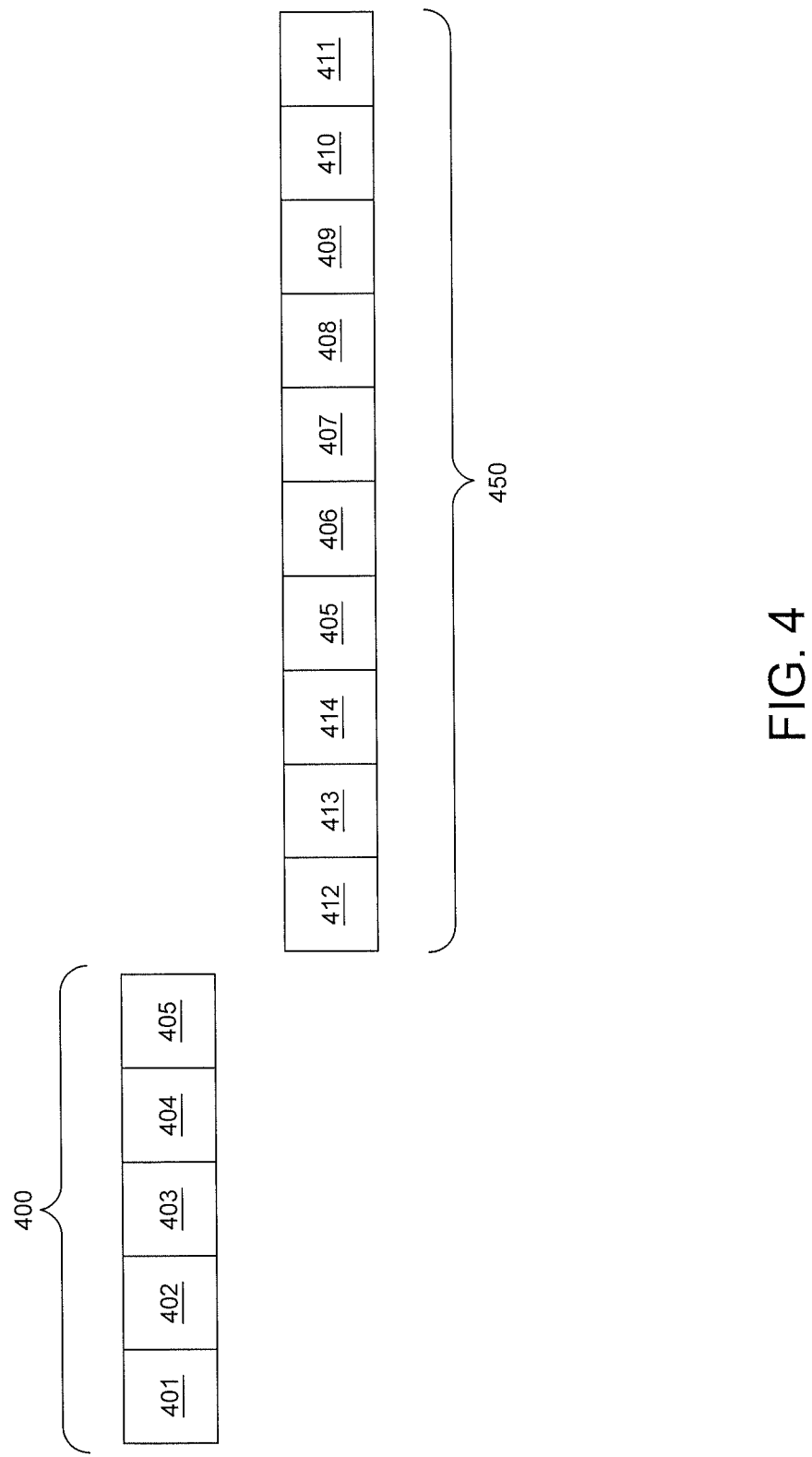

METHOD AND SYSTEM FOR DELIVERY OF AUDIO CONTENT FOR USE ON WIRELESS MOBILE DEVICE

CROSS-REFERENCE TO RELATED APPLICATION

This application is related to concurrently filed U.S. application Ser. No. 14/147,297 entitled "Method and System for Playback of Audio Content Using Wireless Mobile Device," the entirety of which is hereby incorporated herein by reference.

FIELD

Aspects of the present disclosure relate in general to music services for enabling a user to listen to a variety of music on a wireless mobile device, and more particularly to methods for playing audio tracks on a wireless mobile device, delivering audio tracks to a wireless mobile device, storing audio tracks on a wireless mobile device, and related devices and systems.

BACKGROUND

The ways in which people listen to music and other types of audio content have changed considerably over the years due to technological advances. It was once common for people to possess collections of music in the form of records, audio cassette tapes, and later compact discs (CDs). With improved compression techniques, maintaining music collections in digital file formats such as MP3 became popular.

Regardless of the underlying audio file format, a key issue for people who want to listen to music (or any other type of audio content, such as audio books, lectures, etc.) pertains to how the music can be accessed. With records, cassette tapes, and CDs, a trip to the record store was the typical way to acquire more music. Portable players for audio cassettes and CDs enabled people to take their music with them, albeit only for a few songs or albums at a time. With improvements in communications networks (e.g., faster access to the Internet) and improved data compression technologies, it has become more common for people to obtain music over a network such as the Internet.

Starting approximately in the mid-1990s, it became possible for individuals (at least those with relatively fast computer networking capabilities) to listen to digitally compressed audio tracks on their computers by converting music on CDs to a compressed digital format (e.g. MP3, AAC etc.) or by downloading audio tracks, typically in the form of songs and albums from websites on the Internet, e.g., in the MP3 file format. In the late 1990s, small portable digital music player devices housing a storage drive and a mechanism (e.g., a cable) for connecting to a desktop computer became available. In October 2001, Apple Inc. introduced the first version of its now ubiquitous portable digital music player known as the iPod® . With the first generation portable digital music players, one needed to physically connect the portable device to a desktop computer to transfer songs in the form of compressed digital audio tracks to the device. As storage capabilities improved, large numbers of songs could be stored on such portable devices. One drawback of such a device was the relatively cumbersome process required to store content on the device for later listening involving acquiring the compressed audio tracks on a desktop computer and then selecting the audio tracks to transfer to the portable device from the desktop computer.

Beginning with the introduction of the iPhone® in 2007 and the mobile version of Apple's iTunes® and App stores, another trend which has impacted the music listening landscape has been the proliferation of wireless networking products and technologies. Users who were formerly restricted to their desktop computers for Internet access can use wireless networking to access the Internet while mobile using portable wireless devices such as smartphones. Individuals can access a variety of online audio content via websites and mobile applications for downloading and streaming music while online. Streaming applications and websites transmit data representing music over a network (e.g., the Internet) as a continuous stream, so that playback of data representing a particular audio track that has already been received and buffered can proceed while subsequent data is still being received. The iTunes® store mobile application permits iPhone® users to search for and wirelessly acquire audio tracks that can be downloaded to the mobile device for later playback. While perhaps less cumbersome then the process of physically connecting the portable device to a desktop computer to acquire audio tracks, the user still must specifically search and select music to be downloaded to the device. Wireless streaming services like the Pandora® mobile software application permit a user to stream audio based on a recommendation system so long as the portable device has an Internet connection. Other types of wireless streaming services, such as iTunes Match® and the Amazon Cloud Player® systems, permit a user to stream songs that the user has previously acquired or stored in the cloud. Of course, if Internet connectivity is disrupted, e.g., due to moving to a location with weak or nonexistent wireless coverage, then music can no longer be streamed. A user whose devices loses wireless connectivity in this manner will no longer be able to stream audio. Further, if wireless connectivity is lost, the user may have to change to another method of audio consumption requiring the user to interact with the mobile device to continue to listen to music, which may be dangerous if the user is engaged in another activity, such as riding a bicycle or driving a vehicle, for example.

With the proliferation of music that is available online, another challenge for consumers is identifying and downloading relevant music that they may want. In addition to deciding which songs or albums they want, consumers using typical conventional technologies have to initiate the downloading of each desired song or album, which can become laborious, especially when the size of the audio library becomes large.

SUMMARY

In certain embodiments of the present disclosure, a method for playing audio tracks on a wireless mobile device includes playing a first audio track on the wireless mobile device by running an application to progressively download the first audio track over a wireless communication link. Upon detecting at the wireless mobile device that the communication link fails to satisfy a connectivity condition, the application is configured to select and play a second audio track that is stored on the wireless mobile device such that the second audio track is playable when the mobile device is not connected to a wireless network, with the second audio track being played without a user of the mobile device initiating the playing of the second audio track.

In certain embodiments, a method for playing audio tracks on a wireless mobile device includes playing a first audio track on the wireless mobile device. Upon detecting at the wireless mobile device that no audio tracks are currently scheduled to be played after the first audio track, the application is configured to select and play a second audio track without a user of the mobile device initiating the playing of the second audio track.

In certain embodiments, a method for delivering audio tracks to a wireless mobile device includes providing to a user of a wireless mobile device an application for receiving and playing audio content, wherein the application is capable of playing a first audio track stored on the mobile device when the mobile device is not connected to a wireless network. A second audio track is transmitted from a remote server to the mobile device over a wireless connection based on a request from the user running the application. The application is capable of playing at least a portion of the second audio track while the second audio track is being transmitted to the mobile device and capable of switching to playing the first audio track without the user requesting playing of the first audio track if the wireless connection fails to satisfy a connectivity condition.

In certain embodiments, a method for delivering audio tracks to a wireless mobile device includes providing to a user of a wireless mobile device an application for receiving and playing audio content. A first audio track is transmitted from a remote server to the mobile device over a wireless connection based on a request from the user running the application. The application is capable of playing at least a portion of the first audio track while the first audio track is being transmitted to the mobile device. The application is further capable of switching to playing a second audio track without the user requesting playing of the second audio track if no audio tracks are currently scheduled to be played at the mobile device after the first audio track.

In certain embodiments, a mobile device includes a transceiver, an audio output component, a computer processor, one or more memory components operatively coupled to the processor, and an application stored in the one or more memory components for processing and playing of digital audio. The transceiver is capable of communication with a remote device over a wireless communication link. The computer processor is operatively coupled to control the transceiver and the audio output component. When running, the application is capable of causing the processor to progressively download a first audio track over the communication link using the transceiver; play at least a portion of the first audio track through the audio output component while progressively downloading the first audio track; monitor the communication link to detect if the link fails to satisfy a connectivity condition; upon detecting a failure to satisfy the connectivity condition, select a second audio track stored in the one or more memory components, wherein the second audio track is playable when the mobile device is not connected to a wireless network; and play the second audio track through the audio output component without a user of the mobile device initiating the playing of the second audio track.

In certain embodiments, a mobile device includes a transceiver, an audio output component, a computer processor, one or more memory components operatively coupled to the processor, and an application stored in the one or more memory components for processing and playing of digital audio. The transceiver is capable of communication with a remote device over a wireless communication link. The computer processor is operatively coupled to control the transceiver and the audio output component. When running, the application is capable of causing the processor to: progressively download a first audio track over the communication link using the transceiver; play at least a portion of the first audio track through the audio output component while progressively downloading the first audio track; upon detecting that no audio tracks are currently scheduled to be played after the first audio track, select a second audio track; and play the second audio track through the audio output component without a user of the mobile device initiating the playing of the second audio track.

In certain embodiments, a system comprises a remote network and a mobile device. The remote network includes one or more servers and one or more storage units. The storage units include audio data of a plurality of audio tracks. The mobile device includes a transceiver capable of communication with the remote network over a wireless communication link, an audio output component, a computer processor operatively coupled to control the transceiver and the audio output component, one or more memory components operatively coupled to the processor, and an application stored in the one or more memory components for processing and playing of digital audio. When running, the application causes the processor to: progressively download a first audio track over the communication link from the one or more servers; play at least a portion of the first audio track through the audio output component while progressively downloading the first audio track; monitor the communication link to detect if the link fails to satisfy a connectivity condition; upon detecting a failure to satisfy the connectivity condition, select a second audio track stored in the one or more memory components of the mobile device, wherein the second audio track is playable when the mobile device is not connected to the remote network; and play the second audio track through the audio output component without a user initiating the playing of the second audio track.

In certain embodiments, a system comprises a remote network and a mobile device. The remote network includes one or more servers and one or more storage units. The storage units include audio data of a plurality of audio tracks. The mobile device includes a transceiver capable of communication with the remote network over a wireless communication link, an audio output component, a computer processor operatively coupled to control the transceiver and the audio output component, one or more memory components operatively coupled to the processor, and an application stored in the one or more memory components for processing and playing of digital audio. When running, the application causes the processor to: progressively download a first audio track over the communication link from the one or more servers, using the transceiver; play at least a portion of the first audio track through the audio output component while progressively downloading the first audio track; upon detecting that no audio tracks are currently scheduled to be played after the first audio track, select a second audio track; and play the second audio track through the audio output component without a user initiating the playing of the second audio track.

In certain embodiments, a method for storing audio tracks on a wireless mobile device includes running an application on the wireless mobile device to progressively download a first audio track based on at least one user preference over a wireless communication link with a remote network. The remote network is configured to select a second audio track based on the at least one user preference and transmit the second audio track wirelessly to the mobile device without a user of the mobile device initiating the transmission of the second audio track such that the second audio track is playable when the mobile device is not wirelessly connected to the remote network.

In certain embodiments, a method for delivering audio tracks to a wireless mobile device includes providing to a user of the wireless mobile device an application for receiving and playing audio tracks and wirelessly transmitting a first audio track to the mobile device based on at least one preference of the user. Remote from the application, a second audio track is determined based on the at least one preference of the user. The second audio track is wirelessly transmitted to the mobile device without the user of the mobile device initiating the transmission of the second audio track such that the second audio track is playable by the application when the mobile device is not connected to a wireless network.

In certain embodiments, a mobile device comprises a transceiver, an audio output component, a computer processor, one or more memory components operatively coupled to the processor, and an application stored in the one or more memory components for processing and playing of digital audio. The transceiver is capable of wireless communication with a remote network over a wireless communication link. The computer processor is operatively coupled to control the transceiver and the audio output component. When running, the application causes the processor to progressively download a first audio track based on at least one user preference over the communication link from the remote network, and play at least a portion of the first audio track through the audio output component while progressively downloading the first audio track. The remote network is configured to select a second audio track based on the at least one user preference and transmit the second audio track wirelessly to the mobile device for storage in the one or more memory components without the user initiating the transmission of the second audio track such that the second audio track is playable when the mobile device is not wirelessly connected to the remote network.

In certain embodiments, a system comprises a mobile device and a remote network. The mobile device includes a transceiver capable of wireless communication over a wireless communication link, an audio output component, a computer processor operatively coupled to control the transceiver and the audio output component, one or more memory components operatively coupled to the processor; and an application stored in the one or more memory components for processing and playing of digital audio. When running, the application causes the processor to progressively download a first audio track based on at least one user preference over the communication link, and play at least a portion of the first audio track through the audio output component while progressively downloading the first audio track. The remote network includes one or more remote servers capable of wireless communication with the mobile device over the wireless communication link, and one or more storage units containing audio data of a plurality of audio tracks. The remote network is configured to select a second audio track from the storage units based on the at least one user preference, and transmit the second audio track wirelessly from the remote servers to the mobile device without a user of the mobile device initiating the transmission of the second audio track. The second audio track received at the mobile device is stored in the one or more memory components of the mobile device and playable when the mobile device is not wirelessly connected to the remote network.

BRIEF DESCRIPTION OF THE DRAWINGS

The following will be apparent from elements of the figures, which are provided for illustrative purposes and are not necessarily to scale.

FIG. 4 is an example of continuous play in accordance with certain embodiments.

DETAILED DESCRIPTION

This description of the exemplary embodiments is intended to be read in connection with the accompanying drawings, which are to be considered part of the entire written description.

Various embodiments of the present disclosure address deficiencies of conventional music delivery and/or playback technologies, including the deficiencies described above. One exemplary embodiment described herein is a music service provided through a mobile software application referred to herein as "Yonder" that enables a user to explore and listen to music and other audio content in new ways that simplify and enhance the user's experience. For convenience, certain aspects of the systems and methods described herein and in the accompanying drawings are designated with the label Yonder. In certain embodiments, the application merges online and offline modalities seamlessly. In other embodiments, the application makes relevant audio content available to the user with minimal user effort by leveraging various social network capabilities, such as determining a song to store for later listening or to play next based on a correlation between the user's preferences and related albums, songs, genres, or playlists from which other people have expressed a preference. Yonder makes it easy for a user to enjoy relevant music with little or no effort by exploiting information from other people's music preferences.

Figure 1:
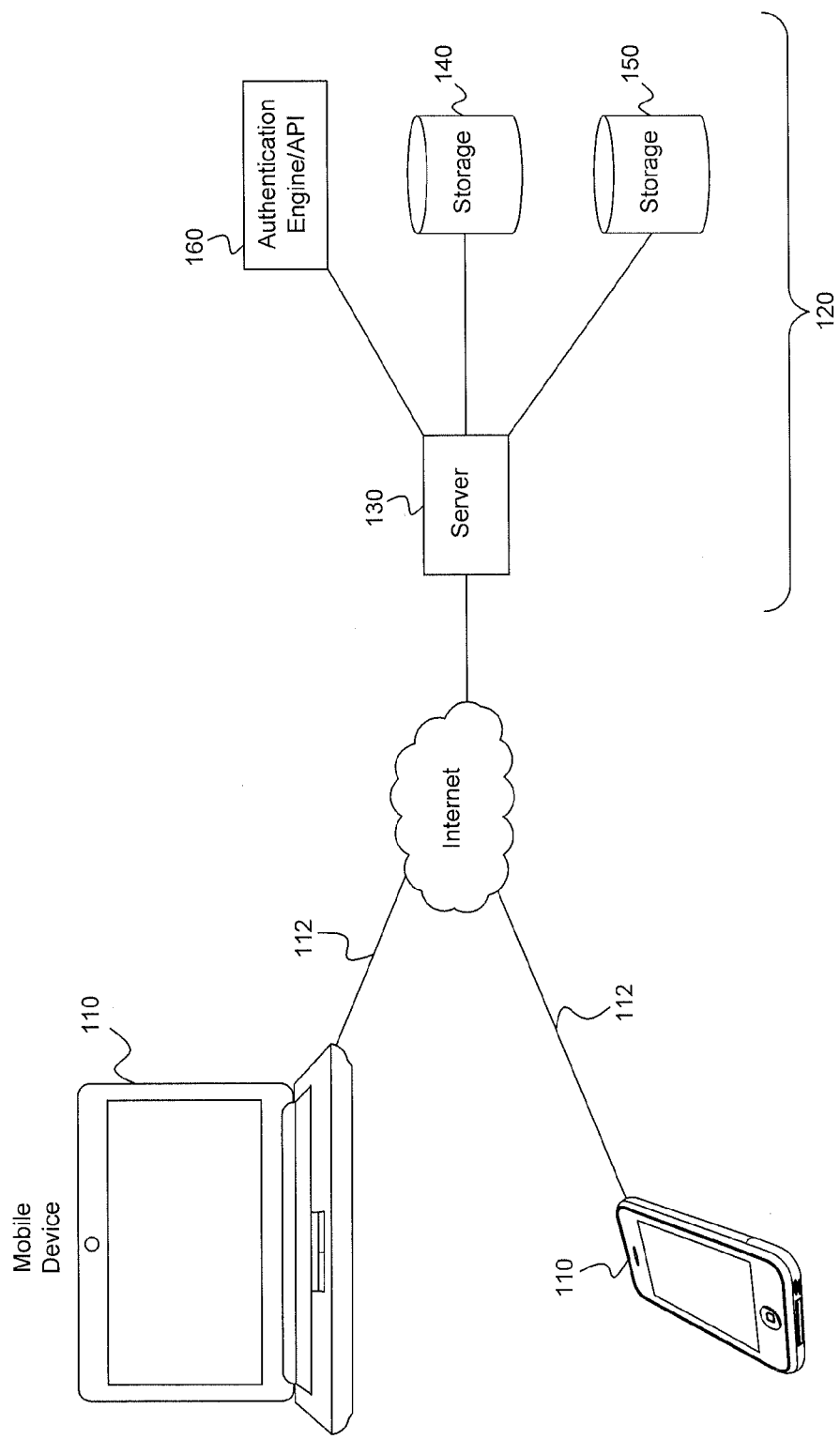
FIG. 1 is a block diagram of a system in accordance with certain embodiments of the present disclosure.

Referring to FIG. 1, a system 100 in accordance with certain embodiments includes a mobile device 110 and a remote network 120. The remote network 120 may include one or more servers (e.g., server computers) 130 and one or more storage units 140. For convenience, the following description refers to server 130 and storage unit 140, although any number of servers and/or storage units may be used. Storage unit 140 includes audio data for various audio tracks. A track may be one of several songs or pieces of music or other audio content that can be represented electronically with audio data. The audio data stored at storage unit 140 may be stored in any suitable format, e.g., MP3. Other data associated with the audio content may also be stored at storage unit 140. For example, storage unit 140 may store the data representing songs in a particular album, as well as metadata such as images corresponding to artwork for that album and any other relevant metadata (e.g., artist name, album name, track names, number of tracks, genre, track or album duration, lyrics, comments about the tracks or album, etc.).

Mobile device 110 is capable of connecting wirelessly with server 130, e.g., using a network such as the Internet, to access tracks stored at storage unit 140. A wireless communication link 112 has bandwidth for the mobile device 110 to transmit and receive audio data and metadata. Server 130 may be referred to as a cloud server. Examples of a notebook computer and a smartphone are shown for wireless mobile device 110 in FIG. 1, although various other wireless mobile devices may be used as well (e.g., tablet computer; Internet-enabled watch or headgear such as a visor or glasses; Internet-enabled module packaged in a vehicle; etc.). A user may run an application on mobile device 110 to access and listen to audio content in various ways.

Remote network 120 may include one or more databases 150 for storage of information regarding users and relevant statistics such as how often certain audio tracks are played by users. Users of mobile device 110 can create playlists and add songs to them, and users can view, select, and/or express a preference for playlists created by other users, and statistics regarding playlists (e.g., how many users like or have selected a particular playlist) can be stored at database 150. Users of mobile device 110 can also subscribe to or follow other users, and this information can also be stored at database 150 and can be retrieved later to facilitate social network-based music selection. Database 150 may also include metadata regarding the audio tracks that the mobile devices 110 can download from server 130. In certain embodiments, storage unit 140 and database 150 may be combined into a single database.

Figure 2:
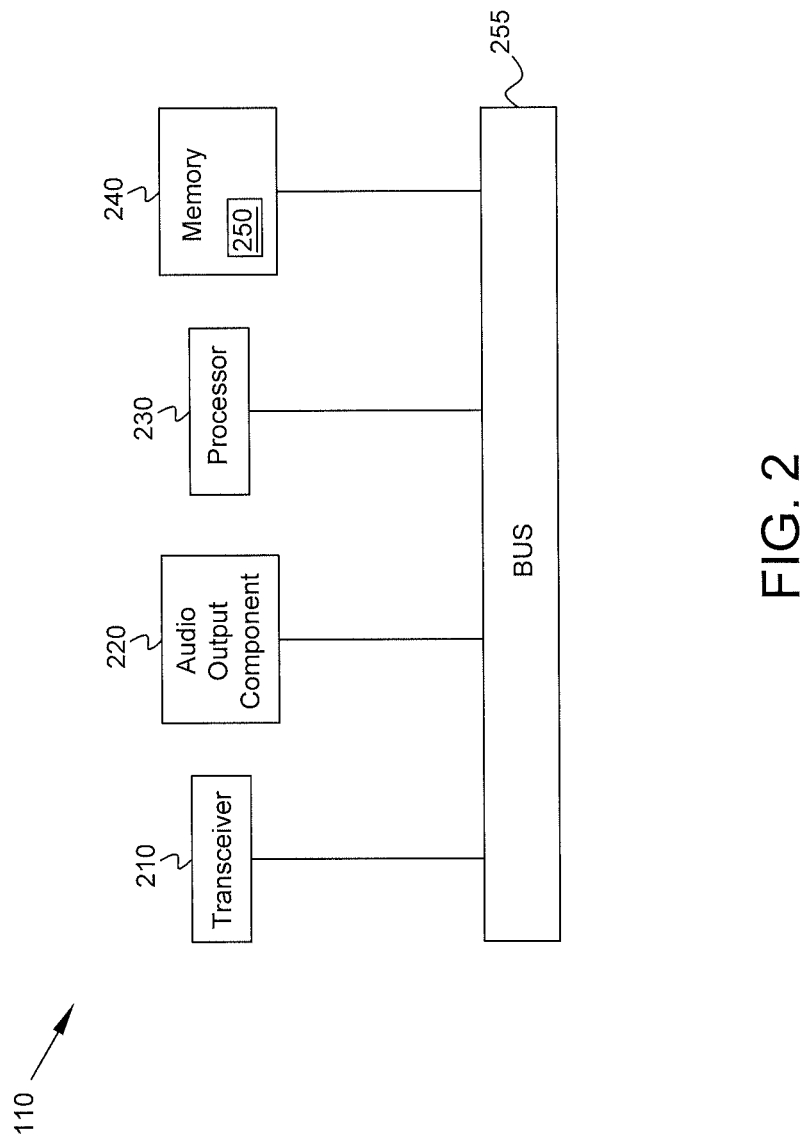
FIG. 2 is a block diagram of a mobile device in accordance with certain embodiments.

Referring to FIG. 2, mobile device 110 includes a transceiver 210, an audio output component 220, a computer processor 230, one or more memory components 240, and an application 250 stored in the memory component(s) 240 for processing and playing of digital audio. Memory component 240 may be any of various types of memory, e.g., flash memory. Mobile device 110 may also include an input component such as a keyboard (not shown). The keyboard may be a physical keyboard with buttons that the user may press, or it may be a virtual keyboard that is displayed on a touch sensitive screen that is also used to display output. A microphone and a speech recognition module may optionally be used for providing input to mobile device 110. Transceiver 210 is capable of communication with a remote device (e.g., server 130) over a wireless communication link, e.g., using a communications protocol such as HTTP. Audio output component 220 may include a speaker or an audio output jack capable of providing audio to headphones via a suitable cable. Processor 230 is operatively coupled to control transceiver 210, audio output component 220, and memory component(s) 240, e.g., via a bus 255. The user of mobile device 110 can run application 250 to perform various tasks.

In certain embodiments, audio content is made accessible to a user of application 250 with a one-time license fee. For example, mobile device 110 may be provided to the user with application 250 already provided (loaded or installed) therein, and the licensee fee incorporated into the cost of the device may entitle the user usage of mobile device 110 and application 250 for the lifetime of mobile device 110. Alternatively, application 250 may be made available for users to download (e.g., from a website or another application for downloading mobile applications (e.g. Apple's App Store) for a one-time license fee. Thus, in certain embodiments the user can avoid having to pay on a per-download basis (e.g., fixed or variable fee per download of each track or album) or on a subscription basis (e.g., involving a monthly or annual subscription fee). A one-time license fee may entitle the user of application 250 to unlimited downloads and plays of music from a large music library.

Although music and songs are described in various examples herein for convenience, it should be understood that various embodiments can involve providing, accessing, and playing any type of audio content.

In certain embodiments, an account is maintained (e.g., at database 150) for each user, and a user may login to her account using any licensed mobile device 110 on which application 250 is stored. A user may login using any known technique, e.g., by entering a user ID/password pair or any other suitable authentication information. An authentication engine or API 160 operably coupled to server 130 may be used to support login authentication. Authentication engine or API 160 may enable the user to login using the same credentials (e.g. username/password pair) that she uses to login to a social network or email system, for example.

Digital rights management (DRM) technology may be used to enforce the rule that only licensed devices 110 are authorized to play audio files obtained from server 130 in accordance with certain embodiments. The DRM technology is designed to support the usage rules that only devices 110 associated with registered user accounts can download and only licensed devices 110 can playback. The catalog of music available to a user for download will depend on the territory according to music licensing rights and restrictions. For example, the available catalog of audio files for a particular territory is only viewable and downloadable by devices 110 authorized for that territory.

Licensed music available as compressed audio files on the exemplary Yonder application may be distributed by download, including a progressive download model that enhances the user experience by enabling playback to start before the entire audio file download is complete. With progressive downloading, a fragment of an audio file is downloaded from server 130 to memory 240 of mobile device and is capable of being played by processor 230 through audio output component 220 even before the entire audio track has been downloaded.

Figure 3A:
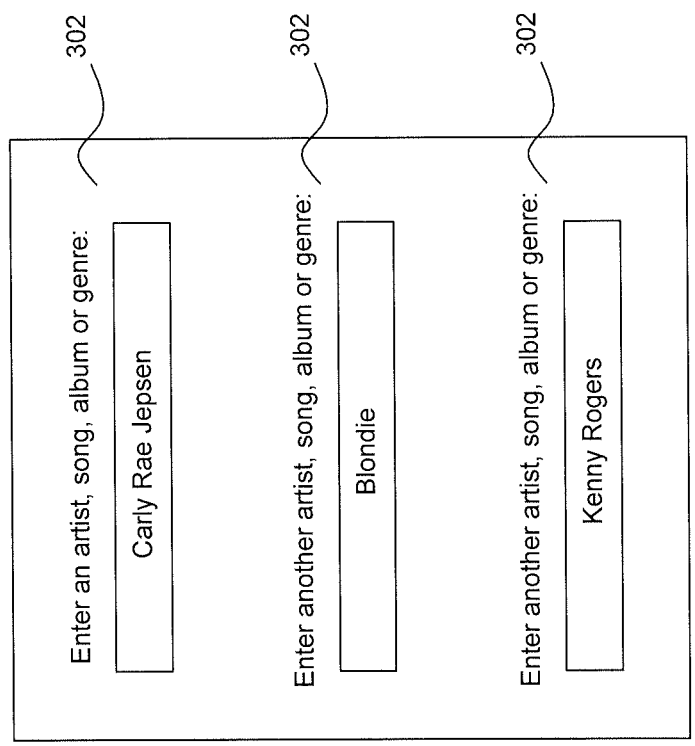
FIGS. 3A-3K are example screenshots of a graphical user interface (GUI) displayed by an application in accordance with certain embodiments.

In certain embodiments, application 250 provides a relatively effortless and passive basic experience for a user who desires to listen to audio content such as music, and also provides powerful social discovery tools for users to access and experience music in a more sophisticated manner. When a user first launches application 250 on mobile device 110, an "onboarding" (initialization or setup) process may be performed to provide the user with an initial library of music content. Referring to FIG. 3A, the user may be presented with a screen that includes an input prompt 302 for the user to enter a preference of the user, for example, in the form of a song title, album title, artist name (performer name), or genre.

If the user enters a song title at the input prompt 302 shown in FIG. 3A, mobile device 110 downloads the corresponding track (song) from server 130. The remaining songs from the album containing the inputted song title may also be downloaded to device 110 for later playback. In certain embodiments, server 130 identifies the most popular playlist that contains either the inputted song or a song from the album containing the inputted song. A playlist is a list of audio tracks, and the list may be stored in any suitable format. Popularity of playlists may be measured in a variety of ways including by the number of times users have selected or expressed a preference for a playlist of another user or, for example, by the subjective reputation of an individual who created the playlist. For example, songs contained in the playlist from a well-known music critic may rank higher than playlists for a typical user. Mobile device 110 may download the identified most popular playlist and/or may download the audio tracks themselves that are referenced in the playlist. In certain embodiments, mobile device 110 identifies the N most popular playlists (where N is a positive integer), and these playlists (and/or the audio tracks referenced in these playlists) may be downloaded. The process of downloading a playlist can occur in the background based on the musical preferences provided by the user during the onboarding process. In accordance with certain exemplary embodiments of the present invention, the user does not initiate the process of downloading songs contained on playlists related to the user's music preferences.

Playlists may contain pointers to tracks in the Yonder library of audio data (e.g., stored at storage unit 140), rather than the tracks themselves, allowing easy sharing of playlists among users without the need to immediately send the audio files contained on a playlist. Users can create, manage, and share playlists, which increases the degree to which users can benefit from other users' participation in the Yonder music service.

If the user enters an album title at the input prompt 302 shown in FIG. 3A, mobile device 110 downloads the corresponding album from server 130. In certain embodiments, server 130 identifies at least one playlist containing the most-played song by the artist corresponding to that album title. Reporting of play counts from mobile devices 110 to server 130 can be used to determine the most-played song though other methods may be user, including relying on publicly available lists of the most popular or bestselling songs. Mobile device 110 may download this identified playlist (or playlists) and/or may download the audio tracks themselves that are referenced in the playlist(s). In certain embodiments, instead of merely identifying one or more playlists containing the most-played song by the artist corresponding to the inputted album title, server 130 identifies one or more playlists containing the N most-played songs, where N is a positive integer (i.e., song played most often, song played second-most-often, etc.)

If the user enters an artist name at the input prompt 302 shown in FIG. 3A, the most recent album (or, in certain embodiments, any album) from that artist will be downloaded from server 130 to mobile device 110. In certain embodiments, server 130 identifies at least one playlist containing the most-played song (or N most-played songs) by that artist. Mobile device 110 may download this identified playlist (or playlists) and/or may download the audio tracks themselves that are referenced in the playlist(s).

If the user enters a genre at the input prompt 302 shown in FIG. 3A, the top N songs from that genre may be downloaded to mobile device 110 from server 130, where N is a positive integer. The top N songs for each genre may be determined based on reported play counts, based on how many times users have indicated a preference for each song, based on any of several song popularity charts that are well-known to one of ordinary skill in the art, or based on a human's (e.g., music critic's) selection, for example.

In certain embodiments, after the user has entered input at the input prompt shown in FIG. 3A, one or more additional, similar input prompts may be shown to the user so that additional information about the user's preferences can be obtained. FIG. 3A shows an example in which the user is prompted three times, but any number of prompts may be used.

The audio tracks that are downloaded in the onboarding process may be downloaded in the background, and may be assigned a lower priority than a track that is being progressively downloaded and currently played. Thus, the background downloads will not interfere with the quality of the audio of the track that is currently being played. The background downloads may occur at a time in the future when there is little or no competition for wireless connectivity, for example.

Thus, an initial library of audio tracks and related metadata stored on the mobile device 110 is automatically built with relatively little effort and awareness on the part of the user. For example, the user is only aware of the inputs that she has entered to the input prompt(s) 302 shown in FIG. 3A and is not aware of all of the audio tracks and/or playlists that are downloaded to mobile device 110 as a result of the onboarding process, at least not until the user hears those tracks played or selects a screen displayed on mobile device 110 that shows all the audio content that has been downloaded.

Audio tracks and related metadata that are downloaded to mobile device 110 as a result of the onboarding process may be stored to memory component 240 of mobile device 110 in a manner that is referred to herein as temporary storage, which is described below. An amount of storage space within memory component 240 is reserved for audio tracks and related metadata of tracks that have been downloaded. The amount of storage reserved for this purpose may be changed by the user of mobile device 110, e.g., through a graphical user interface (GUI) displayed by application 250. For example, memory component 240 may have 32 GB of storage, of which 8 GB are reserved for audio data and metadata of downloaded tracks. Any amount of storage may be available in memory component 240, and any part of that may be reserved as described above.

The capability of playing an audio track "from the cloud," i.e., by progressively downloading the track from server 130 and without the track having been previously stored in mobile device 110, is convenient for a user because the user can access many more tracks than could be stored in mobile device 110. A tradeoff for that convenience is that wireless connectivity to the cloud is needed in order to play tracks from the cloud. Various embodiments of the present disclosure address that tradeoff by also providing users the capability to seamless switch to playing audio tracks stored locally. Once a track has been downloaded to memory component 240, it can be played locally at mobile device 110 without requiring a wireless connection with server 130.

In certain embodiments, when a track is initially downloaded to mobile device 110 from server 130, the audio track is designated for temporary storage within the reserved storage region of memory component 240. Additional content may be stored in the reserved storage region (e.g., 8 GB out of the total 32 GB available in the memory component 240 of device 110) until that storage region becomes full and space needs to be reclaimed for new audio data or new metadata. Temporary storage as described herein is distinct from the temporary storage of audio data as part of streaming audio common in mobile software applications such as Pandora® since the temporary storage of audio tracks as described herein are still accessible and playable by a user even when there is no wireless connection and when the application has been closed and relaunched. Audio tracks and related metadata may be automatically removed based on a least recently used (LRU) algorithm. Other removal/purging algorithms than LRU can also be used. Automated and/or predictive storage management may be used for mobile device 110. This feature allows management of music files on a mobile device 110 with limited storage and helps intelligently manage the library of music files on the device. This feature, for example, may include using user preferences to purge previously downloaded tracks to make room for new music files or otherwise helpfully manage the user library. For example, if a user preference for bluegrass music is inferred, bluegrass tracks may be prioritized for retention, even if they have not been played in a long time.

At any time, the user may manually remove audio tracks and related metadata from mobile device 110.

In a preferred embodiment, the user may also desire to keep a particular audio track or set of tracks by marking that track or set of tracks as a "favorite." This will result in the audio track being "permanently" stored such that the selected track or set of tracks will not be susceptible to being deleted automatically (e.g., via the LRU algorithm) when the reserved storage region becomes full. In certain embodiments, marking a track or set of tracks (e.g. album) as a favorite does not cause the audio track and related metadata for that track to be altered within the memory component 240 but instead provides a tag associated with the audio track that causes the track to be excluded from the LRU removal algorithm. When an album is marked as a favorite, each track within that album may be accorded favorite status. Thus, marking a track or album as a favorite changes the value of a flag, which may be stored in memory component 240, that indicates whether that track or album will reside on the user's mobile device 110 until the user manually removes that track or album.

Hence, there are three possible states for any audio track that is capable of being served by server 130. A first state corresponds to the track not being present within mobile device 110. This may occur if the track has not yet been downloaded to mobile device 110 from server 130, or if it was downloaded at some point in the past but was subsequently removed (either automatically by the LRU removal algorithm or manually by the user). In the first state, the track is played by progressively downloading the track from server 130 to mobile device 110. Due to the nature of progressive downloading, the track can be played even before all of the audio data corresponding to that track has been downloaded. A first icon, e.g., a gray plus sign (+), can be used to be designate tracks in the first state.

Once the track has been fully downloaded, the track is in the second state at mobile device 110—it is in temporary storage, susceptible of being removed (cleared) by the LRU algorithm if more space is needed and susceptible of being removed based on a request by the user. A second icon, e.g., a blue plus sign (+), can be used to designate tracks in the second state.

If the user marks the track (or the album containing that track) for favorite status (i.e., permanent storage status), the track will be in the third state at mobile device 110—permanently stored, until the user manually removes that track or the album containing that track. A third icon, e.g., a star, can be used to designate tracks in the third state.

In certain embodiments, a single gesture by the user (e.g., pressing, swiping, or otherwise activating the second icon) can change the state of the track from the second state to the third state. Any other iconography or symbols can be used instead of the gray plus sign, blue plus sign, and star described above. For example, a gray cloud, gray star, and blue star can be the symbols for designating tracks in the respective first, second and third states described above.

Playback of any track that is in the second or third state described above can be achieved via local access of the requested data from memory component 240 of mobile device 110, without needing to use a wireless communication link to download the audio data for that track from server 130. This advantageously minimizes demand on bandwidth. Each audio track in the second or third state is stored with the associated metadata (e.g., album artwork, track name, etc.) so that the metadata can be accessed and used (e.g., displayed to the user) even in an offline mode, i.e., without wireless connectivity between mobile device 110 and the remote network 120 that includes server 130.

With visual icons designating each state, the user can quickly determine which audio tracks are stored on her mobile device 110 and which will require downloading from the cloud (from server 130), and she can manage the contents of memory component 140 manually if desired.

Figure 3B:
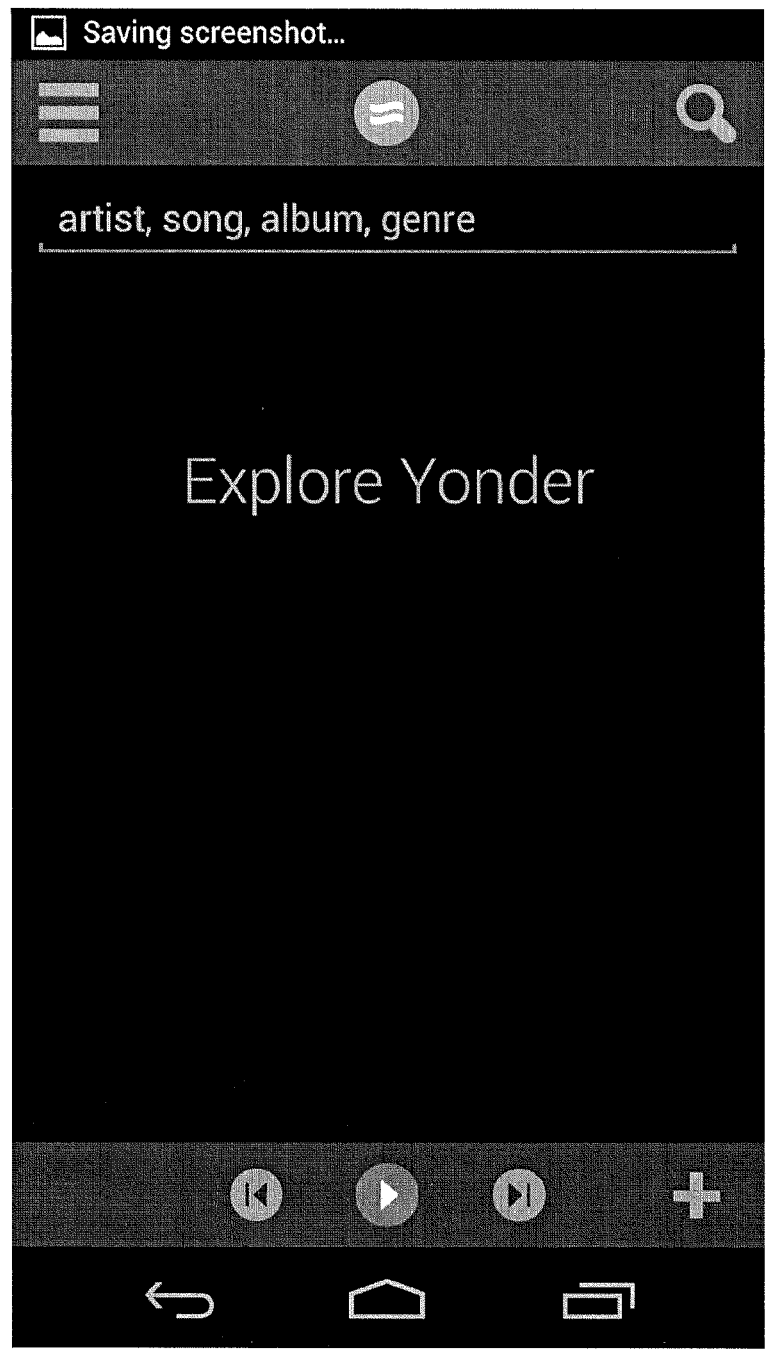
Figure 3C:
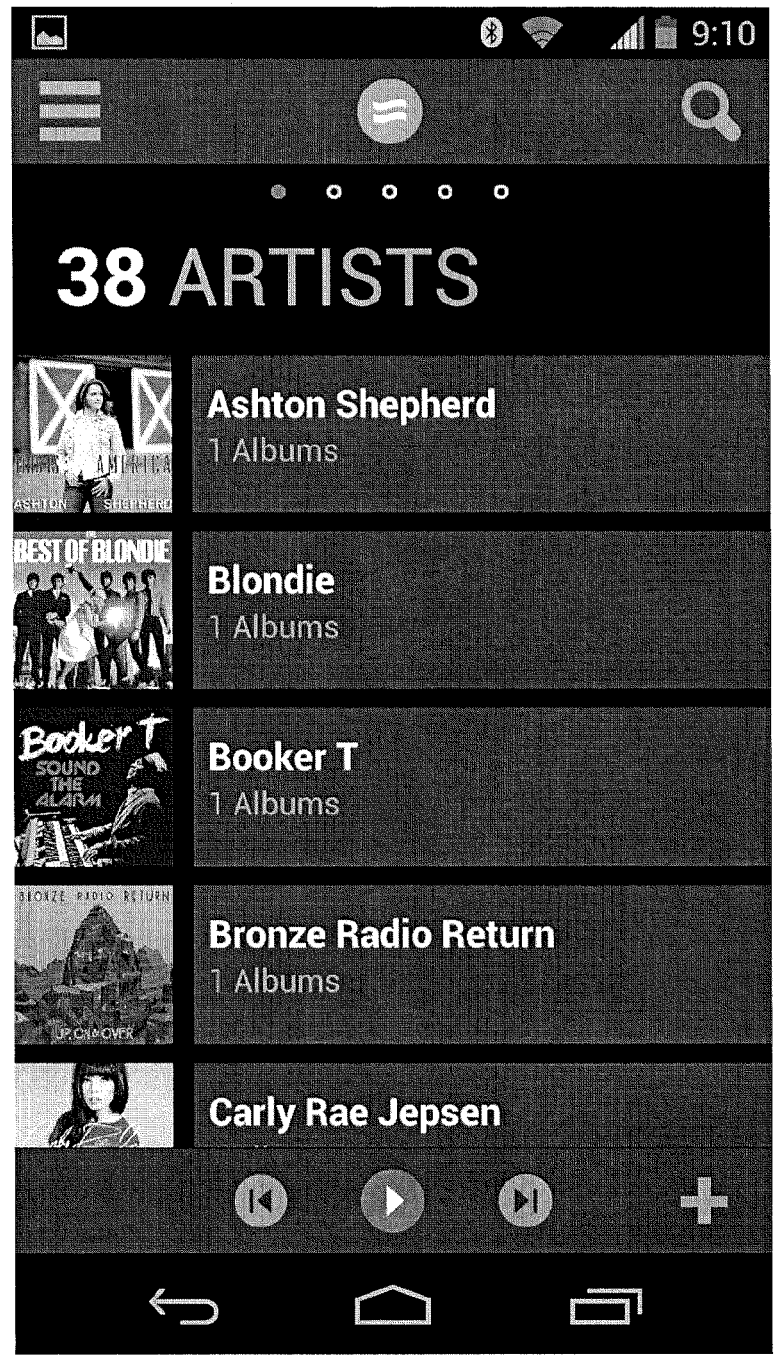

Audio tracks can be selected for playing in various ways. Tracks that were downloaded via the onboarding process can be viewed by the user, and selected, at an appropriate screen in the GUI that is displayed by application 250. An example of such a screen is shown at FIG. 3C. The user may also request a track, album, artist, or genre using a search screen presented by the GUI as shown in FIG. 3B. As the user enters text at the search prompt, an entry may be auto-completed based on matching information stored at database 150. Various search results (search hits) may be shown, and the user may select one of the search results. If the track corresponding to the selected search result is already stored within mobile device 110, it can be played locally; otherwise, it will be progressively downloaded.

Another way for users to explore and access music is through a recommendation list displayed with the GUI. This is a view of social interactions on the system and it displays content that the user community is interacting with which may be relevant for the current user (i.e., the user of the mobile device 110 on which this recommendation list is being displayed currently). Music may be recommended to the user based on the following weightings. The weighting associated with each of the following categories may be the probability that a track or album from that category will be selected to be shown to the user at a particular position in the recommendation list.

At a first category, music being listened to by one or more persons that the user is following may be shown in the recommendation list with weighting of 40%. "Following" refers to the capability of a first user to select to follow a second user, which the first user may do if she finds that she likes the musical taste of the second user, for example.

At a second category, music deemed relevant to user's musical interests, as determined from the onboarding process, may be shown in the recommendation list with weighting of 20%. For example, this may include displaying music being listened to by persons with similar genre preferences as the user.

At a third category, certain songs (e.g., especially popular songs) within a genre for which the user expressed a preference may be shown in the recommendation list with weighting of 10%.

At a fourth category, one or more #1 (top-rated) songs in the user's preferred genre(s) may be shown in the recommendation list with weighting of 10%, where top-rated may refer to a rating on a popularity chart or list that is well-known to one of ordinary skill in the art.

At a fifth category, the top tracks from the Yonder list each day in the user's preferred genre(s) may be shown in the recommendation list with weighting of 10%.

At a sixth category, any of the following may be shown in the recommendation list with weighting of 10%: tracks on playlists that the user subscribes to; tracks on playlists created by people that the user is following; tracks that debuted in the top 10 on the Yonder list. The Yonder list refers to a list of tracks based on how often tracks have been requested by users and/or ratings by one or more music critics.

In certain embodiments, a user of mobile device 110 can add a currently playing song to a playlist. The user may create any number of playlists and may assign names to her playlists. To add a song to a playlist, the user may press (or click, or otherwise activate) a, icon, for example. In the example GUI shown in FIG. 3D, the plus sign (+) at the lower right corner of the screen is such an icon. In other example GUIs, other symbols or icons different than a plus sign can be used. A menu, e.g., as shown in FIG. 3H, may present the user with the option to add the currently playing song to a playlist, among other options. Based on the user's action, a screen such as the one shown in FIG. 3I may be displayed, giving the user the option to create a new playlist or add the currently playing song to an existing playlist (here, an existing playlist entitled "Foo"). The menu in FIG. 3H is optional and can be bypassed. Users may view and select the playlists of other users and thus may be exposed to additional content as a result of the social characteristics of embodiments of the present disclosure. Statistics regarding how often various playlists are played, and how often various user's playlists are played, may be reported to server 130.

When a user selects a track to be added to a playlist, the selected track may be identified as a low priority track for background downloading, similar to music identified as relevant as a result of the onboarding process. The selected track will be downloaded, but not necessarily immediately.

In certain embodiments, regardless of how a track is chosen for playing (e.g., through the system picking one of the tracks resulting from the onboarding process, or through the user searching for a track, or through the user clicking on a track that was shown to her as a recommendation), a continuous play feature ensures that music continues to play even after that track is finished playing. The continuous play feature is also applicable if the user selected a playlist and the last song in the playlist is currently being played. With conventional music playing systems, when a single track or a playlist is selected for playing, that single track plays to completion, or the tracks in that playlist play to completion, and the conventional system stops playing music since there is nothing queued to play next. In such a situation, the user of a conventional music playing system must select additional content to play, which can present a distraction to the music listening experience. In certain embodiments of the present disclosure, in contrast, additional relevant audio content is automatically selected for playing, as described in detail below. The additional music (or other audio content) that is selected for playing with the continuous play feature can be music that is selected based on information from a social network of which the user is a member or participant. For example, additional music can be selected for playing based on social network features such as "following" a user and "subscribing" to a playlist.

When an audio track is currently playing at mobile device 110 and there are no additional audio tracks scheduled to be played at the mobile device (e.g., if the currently playing track was selected individually, or if it is the last track in a currently playing playlist), the currently playing track (or the artist corresponding to the currently playing track) is used as a basis for determining additional audio content to play next. The currently playing track may be referred to as a seed track, because it used to determine additional tracks to play, analogous to a pseudorandom number generator that generates pseudorandom numbers based on a seed value. In this circumstance, server 130 may be searched for additional audio content to play which is relevant to the currently playing content, where relevance is determined based on socially derived algorithms (e.g., algorithms based on features or relationships in a social network). In order to create variance in the results, which may be pleasant to the user's listening experience, one of the following algorithms may be selected at random, with weightings as indicated below. For example, there is a 40% chance that algorithm A1 (described below) will be used because the weighting for algorithm A1 is 40%. The server 130 uses the selected algorithm to select the next playlist that is to be played at mobile device 110. If one of the following algorithms cannot be used because a characteristic of that algorithm is impossible to meet, that algorithm may be removed from the list of algorithms, and the percentages (weightings) for the remaining algorithms may be adjusted accordingly, to sum to 100%.

Algorithm A1: Select a playlist from someone who a) has a genre preference that matches the genre of the seed track; and b) is followed heavily (e.g., with more than a predetermined or threshold number of followers). "Following" as referred to above is a social network feature or relationship (i.e., link between users) wherein a first user who likes or prefers the musical taste of a second user can provide a suitable input (e.g., button press or tap, keystroke, click, etc.) to follow the second user. By keeping track of who is following whom, server 130 contains useful social network information that is utilized by algorithm A1. For example, suppose a user (e.g., call her Sally) is interested in jazz music. If a well-known jazz critic (e.g. call him John) has a large number of followers on the social network and a genre preference for jazz, then the music choices of John (e.g., as expressed in John's playlists) can be used to provide Sally with additional music to listen to in accordance with algorithm A1. The weighting for this algorithm may be 40%. In other words, there is a 40% chance that algorithm A1 will be selected.

Algorithm A2: Select a playlist that is heavily subscribed to (e.g., with more than a predetermined number of people subscribing to the playlist), that includes the currently playing track. This algorithm uses a different social network feature than "following"—namely, the attribute of "subscribing" to a playlist. Any user can subscribe to, any playlist (e.g., a playlist that another user has expressed an interest for, a playlist that the system selects to play for the user, etc.). Server 130 keeps track of the subscriptions of the various users in the social network, and algorithm A2 uses this subscription information to select music that is likely to be relevant or interesting to the user. The weighting for this algorithm may be 30%.

Algorithm A3: Select a playlist that the current user (i.e., the user of the mobile device 110 on which the current track is playing) has subscribed to and that includes the currently playing track. The weighting for this algorithm may be 10%. Like algorithm A2, algorithm A3 also uses the social network feature of subscribing, algorithm A3 selects a playlist that the user herself subscribed to, rather than simply basing the selection on what others have subscribed to. Thus, social network features such as subscribing can be leveraged in various ways.

Algorithm A4: Select a playlist created by a user that the current user is following. For example, a user Tom may have a friend Becky whom Tom is "following" on the social network. When the music would otherwise stop playing for Tom, the musical preferences of Becky (e.g., expressed in the form of her playlist(s)) can be utilized to identify music to play next, and which Tom is likely to enjoy. The weighting for this algorithm may be 10%.

Algorithm A5: A playlist from an "authority" that the current user is following. The weighting for this algorithm may be 10%. In certain embodiments, all users follow authorities at the outset, though they may later opt out. Authorities are leading experts/influencers/brands that are invited to create online "rooms" that can be viewed with application 250. An authority may be a music label, a journalist, artist, super-fan, an employee at a radio station, a club DJ, etc. Rooms associated with authorities may be curated, themed (artist, genre, sub-genre), distribution environments, for authority-created, exclusive, playlists, which may feature exclusive content. Thus, the social network feature of "following" can be leveraged in various ways, so that additional music can be identified in various ways based on different categories of social network members (e.g., authorities as opposed to non-authorities) being followed.

The overall algorithm which selects a playlist using one of algorithms A1-A5 may be referred to as an online continuous play algorithm or feature because it is applicable when mobile device 110 is online (i.e., has wireless connectivity to server 130) and ensures that continuous play can be maintained. As explained above, the online continuous play algorithm identifies additional music that is likely to be relevant to the user based on information gleaned from the "social sphere," i.e., various features of a social network. The playlist selected by the online continuous play algorithm may be downloaded to mobile device 110 so that it is available to be retrieved automatically in the future, as described below, although in certain embodiments it is not visible to the user (and thus is referred to as an "invisible" playlist) and cannot be selected manually by the user.

The online continuous play algorithm may be used after the onboarding process to select an initial playlist for the user to listen to. Thus, even though the user may have provided only a few input(s) (e.g., three inputs regarding preferred artist, song, album, or genre), she can immediately begin listening to an uninterrupted sequence of tracks. For example, if the user expressed a preference for a particular song during the onboarding process, then that song may be used as a seed to identify audio content based on social network features as described above regarding algorithms A1-A5.

When server 130 selects a playlist which will be the next playlist to be played, the server may send that playlist to mobile device 110 without also sending the audio tracks on that selected playlist to the mobile device. Sending the playlist by itself can conserve resources, e.g., bandwidth and/or storage. In such circumstances, when mobile device 110 starts playing that (next) playlist, the mobile device might have to still retrieve a track of that playlist from server 130 if that track is not already stored in the mobile device.

If algorithm A1 (or A2, A3, A4, A5) is used and multiple playlists P1, P2, . . . , Pm meet the criteria of that algorithm, then one of those playlists may be selected (e.g., at random). Although particular weightings are described for algorithms A1-A5, any weightings may be used. In certain embodiments, only algorithm A1 (or only A2, or only A3, or only A4, or only A5) is ever used, and in other embodiments, different sets of these algorithms may be used. In certain embodiments, an additional criterion imposed for each of algorithms A1-A5 is that only a playlist with at least a predetermined number of tracks (e.g., at least 10 tracks) can possibly be selected to be played next.

Regardless of which algorithm A1, A2, A3, A4, or A5 is used for the online continuous play algorithm, in certain embodiments the playlist that is selected by that algorithm is played after the currently playing track (which is the last track scheduled to be played, if it were not for the continuous play feature) ends. For example, referring to FIG. 4, suppose playlist 400 has been playing, tracks 401, 402, 403, and 404 within that playlist have completed playback, and track 405 is currently playing. With conventional audio playing systems, nothing would be played after track 405 ends. In accordance with certain embodiments, however, playlist 450 is selected (e.g., by one of algorithms A1, A2, A3, A4, A5) to be played next (after track 405 finishes).

The playlist which is to be played next (here, playlist 450) may be played beginning with the track that is after the seed track (which is present in playlist 450), or beginning with the first track in playlist 450 if the seed track is the last track in playlist 450. Tracks in that next playlist 450 are played in order, and playback wraps around to the beginning of playlist 450 after the last song in playlist 450 ends, at which point tracks continue in order until the track in playlist 450 that precedes the seed track. Thus, in the example shown in FIG. 4, after track 405 of playlist 400 finishes playing, track 406 of playlist 450 is played (because it occurs after track 405 in playlist 450), and then tracks 407, 408, 409, 410, and 411 are played, and then tracks 412, 413, and 414 (which is the track preceding seed track 405) are played. Track 414 is used as a new seed track for determining a new "next" playlist (to be played after playlist 450).

In certain embodiments, playback may proceed in an offline mode when mobile device 110 does not have wireless connectivity to remote network 120 (or connectivity is too sporadic) and hence cannot download music from server 130. In the offline mode, mobile device 110 may determine subsequent music to be played so that the user continues to hear a continuous, uninterrupted sequence of tracks. This functionality may be referred to as an offline continuous play mode or feature.

The offline playback mode may be triggered by a predetermined connectivity condition. For example, the predetermined connectivity condition may be the selection by the user of an "airplane mode" for mobile device 110 (or other similar operating mode in which all forms of connectivity available to the device are disabled). Or, the predetermined connectivity condition may be satisfied if the bandwidth (e.g., on a wireless communications link used for communicating with remote network 120) is too low with the existing connectivity when progressively downloading an audio track. This may be determined as follows. If the connectivity is not sufficient to stay ahead of the playhead (i.e., audio data cannot be downloaded fast enough to keep up with the playback of the audio track that is being progressively downloaded), application 250 may output a first indication (e.g., an audio indication such as a tone) indicating buffer underflow and wait up to a predetermined amount of time (e.g., 10 seconds) to see if it can download at least a predetermined duration (e.g., 20 seconds) of additional audio data. If it can queue enough music, then playback may continue. If not, application 250 may output a second indication (e.g., a unique sound) and run an offline continuous play algorithm to determine locally stored audio data (i.e., data stored at memory component 240) that is to be played next. In certain embodiments, if the user is listening to a single song or to an album a buffer underflow would cause playback to stop.

In certain embodiments, the offline playback mode does not engage until a request for audio content is made that cannot be fulfilled in a way similar to the online playback mode in which mobile device 110 is wirelessly connected to remote network 120. If the user of mobile device 110 is playing back content on a playlist and the upcoming song is already stored locally in memory component 240, then the playback experience will continue without the user recognizing loss in connectivity, as the upcoming song can be played from the locally stored data. At the point that playback cannot continue (e.g., when the upcoming song is not locally stored), a distinctive sound will play and an offline playlist (i.e., a playlist to be played in offline mode) will be generated and utilized for playing audio tracks that are stored locally.

When in offline mode, mobile device 110 can select a playlist or track to be played next by selecting one of the following algorithms B1-B5. In order to create variance in the results, one of the algorithms B1-B5 may be selected randomly, with a weighting for each algorithm as indicated below that is similar to the weightings for algorithms A1-A5 described above. If one of the following algorithms cannot be used because a characteristic of that algorithm is impossible to meet, that algorithm may be removed from the list of algorithms, and the percentages (weightings) for the remaining algorithms may be adjusted accordingly, to sum to 100%.

Algorithm B1: Select a playlist that a) contains the seed track and b) was created by the current user (i.e., the user of the mobile device 110 for which offline mode functionality is needed). The weighting for this algorithm may be 40%. If there are no more playlists meeting this criteria, in certain embodiments the logic proceeds to flow to algorithm B2, below. A playlist selected by this algorithm (B1) will begin playback in offline mode at the track that follows the seed track, with wraparound to the beginning of the playlist when the end of the playlist is reached, and this playlist will stop playing when the track that precedes the seed track has completed. At that point, the last song played from this playlist will be used as the next seed track. If any track in this selected playlist is not locally available (stored in memory component 240 of mobile device 110), then such a track is skipped, because it is not possible to obtain the track from server 130 due to the lack of wireless connectivity.

Algorithm B2: Select a playlist that a) contains a track by the same artist as the seed track and b) was created by the current user. The weighting for this algorithm may be 20%. A playlist selected by this algorithm plays from the beginning of the playlist.

Algorithm B3: Select a playlist that a) contains the seed track and b) was not created by the current user. The weighting for this algorithm may be 20%. Examples of a type of playlist not created by the current user may include: 1) a track created by someone other than the current user (e.g., an authority or other member in the social network of the current user); or 2) a playlist that was downloaded to mobile device 110 as a result of being selected by the online continuous play algorithm. These types of playlists that were not created by the current user may, in certain embodiments, be referred to as "invisible" playlists because they are not available for manual selection by the user but are resident on the mobile device and can be automatically selected in the offline playback mode. A playlist selected by algorithm B3 will begin play in the same order as one selected by algorithm B1, i.e., beginning after the seed track, wrapping around at the end of the playlist, and continuing up to and including the track that precedes the seed track. If any track in this selected playlist is not locally available, then such a track is skipped.

Algorithm B4: Select a playlist that a) contains a track by the same artist as the seed track and b) was not created by the current user. Thus, an invisible playlist that includes the seed artist may be selected. The weighting for this algorithm may be 10%. A playlist selected by this algorithm may play from the beginning of the playlist. Thus, by possibly selecting a playlist created by persons other than the current user, algorithms B3 and B4 exploit socially derived features to keep the music playing (after it would otherwise stop) in a way that is likely to be pleasant to the current user.

Algorithm B5: Select a song in the same genre as the seed track. The weighting for this algorithm may be 10%.

Although particular weightings are described for algorithms B1-B5, any weightings may be used. In certain embodiments, only algorithm B1 (or only B2, or only B3, or only B4, or only B5) is ever used, and in other embodiments, different sets of these algorithms may be used.

Thus, regardless of whether mobile device 110 is currently in an online or offline mode, continuous play can be achieved so that the user continues to listen to music in an uninterrupted fashion, e.g., based on socially derived features, until another track is selected by the user or the user chooses to pause or stop playback.

In certain embodiments, when a user is listening to one track in an album, additional tracks in the album can be caused to be downloaded in the background (while the one track is playing), based on an inferred user preference. For example when one track that was progressively downloaded has been playing for a predetermined length of time, other tracks in the same album are automatically downloaded as well, because it can be inferred that the user likes the currently playing track if she has listened to it for that predetermined length of time. Suppose the user selects one track for playing, and that track is not currently stored on the user's mobile device 110. That track will be progressively downloaded, and the user can listen to the track while it is being downloaded. At a designated time (e.g., 30 seconds into the playing of the track), another track from the same album as the first track will start to be downloaded, assuming it is not already stored in mobile device 110. In like manner, the remaining tracks from the album will be downloaded (e.g., one by one) in the background, assuming they were not already present in memory component 240, until the entire album has been downloaded. Thus, a user who only took action to play one song can nonetheless enjoy the benefits of having the other songs from that album locally stored, and the downloading of those other songs can occur while the user is listening to a different song that is being played.

Thus, if the user later wants to play another song from the album, it can be played locally, minimizing bandwidth demands at the later time. The progress of each track that is being downloaded, whether it is the current track being played or a background download (download occurring in the background) of a track different than the currently playing track, may be displayed to the user, e.g., with progress bars.

Thus, with progressive downloading a track can be played before it has been fully downloaded, and one track can be played while one or more other tracks are being downloaded. The other tracks from the album may be downloaded seriatim one after another, or they can be downloaded in parallel. Background downloading can be assigned a lower priority than playing of the current track that is being progressively downloaded, so that audio quality does not suffer for the track that is being played currently. For example, if the bandwidth is determined to be less than a threshold, background downloads can be disabled or paused.

In certain embodiments, the user's musical preferences are inferred by the system based on tracks that the user has recently listened to and/or based on searches like the one shown in FIG. 3B. For example, the top N inferred genre (or artist, or album, etc.) preferences for the user may be inferred. The user's inferred musical preferences identify, for example, those genres that are of primary interest to the user. On a weekly basis the server 130 may send a playlist of popular music to the device based on most-played music in the system that matches user's musical preferences. For example, server 130 may infer the user's three most-preferred genres and may send a fixed or variable number of songs from each genre to mobile device 110.

In certain embodiments, in addition to sending a playlist from server 130 to mobile device 110, audio data is automatically downloaded to mobile device 110. This content may be downloaded (transmitted to mobile device 110) only when the device is connected to power (e.g., charging the device's battery) and/or when the screen is turned off, which may avoid draining the device's battery and avoid competing with other computational tasks for device resources. Although the example weekly updates and downloads has been described, the updating and automatic downloading can occur on any other aperiodic or periodic basis, e.g., monthly or daily. By default the content is also only delivered when connected to WiFi™, although the user may select to have this content delivered when in 3G or 4G scenarios as well.

Thus, relevant audio content is identified and delivered to the user's mobile device based on at least one user preference in several ways. The at least one user preference may include an explicit user preference. For example, the user may indicate her preference for a particular track (or genre, artist, or album) during the onboarding process, or she may indicate her preference by selecting (e.g., clicking, or otherwise activating) a track or album that is displayed in a GUI. The at least one user preference may also include an inferred user preference. The user preference can be inferred based on the fact that the user has been listening to one track in an album for a predetermined length of time, or based on other information such as the user's listening history. In these latter cases, the at least one user preference may include two user preferences—an explicit user preference corresponding to a user selection of a track, and an inferred user preference. In these various ways, an audio library may be generated quickly and efficiently at mobile device 110 even without the user's awareness. As discussed above, preferences of individuals other than the current user can also be used in various embodiments, e.g., to identify additional music to play for the continuous play functionality based on characteristics or relationships in a social network. For example, genre preferences of others can be used as in algorithm A1, subscriptions by other users to a playlist can be used as in algorithm A2, and playlists created by other users in a social network can be selected as in algorithms A4, A5, B3, and B4.

FIGS. 3A-3K are example screenshots of graphical user interface (GUI) display in accordance with certain embodiments.

FIG. 3A displays an example onboarding screen, as described earlier.

FIG. 3B displays an example search screen, as described earlier.

FIG. 3C displays an example screen for showing the artists whose tracks are locally stored on mobile device 110, e.g., as a result of the onboarding process.

Figure 3D:
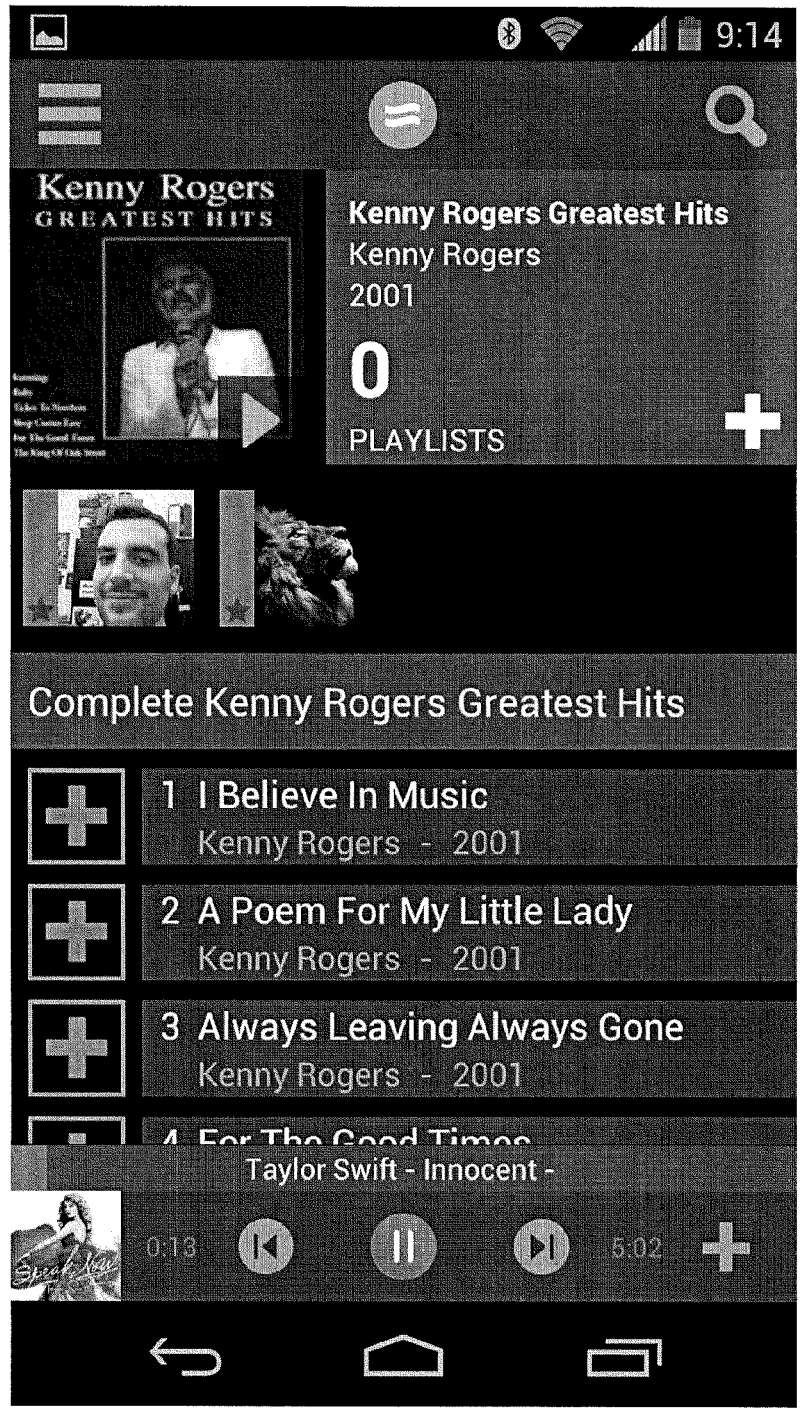

FIG. 3D shows that one song (e.g., a song by the artist Taylor Swift) may be currently playing while the user is viewing available songs by another artist (e.g., Kenny Rogers). FIG. 3D also shows that the user can press an input region (here, "Complete Kenny Rogers Greatest Hits") to download all of the tracks of the album into permanent storage at memory component 240. By "completing" an album in this manner, the user can gain access to all the tracks in an album so that they can be played locally, and only minimal user effort is needed (e.g., one press on a touch screen).

Figure 3E:
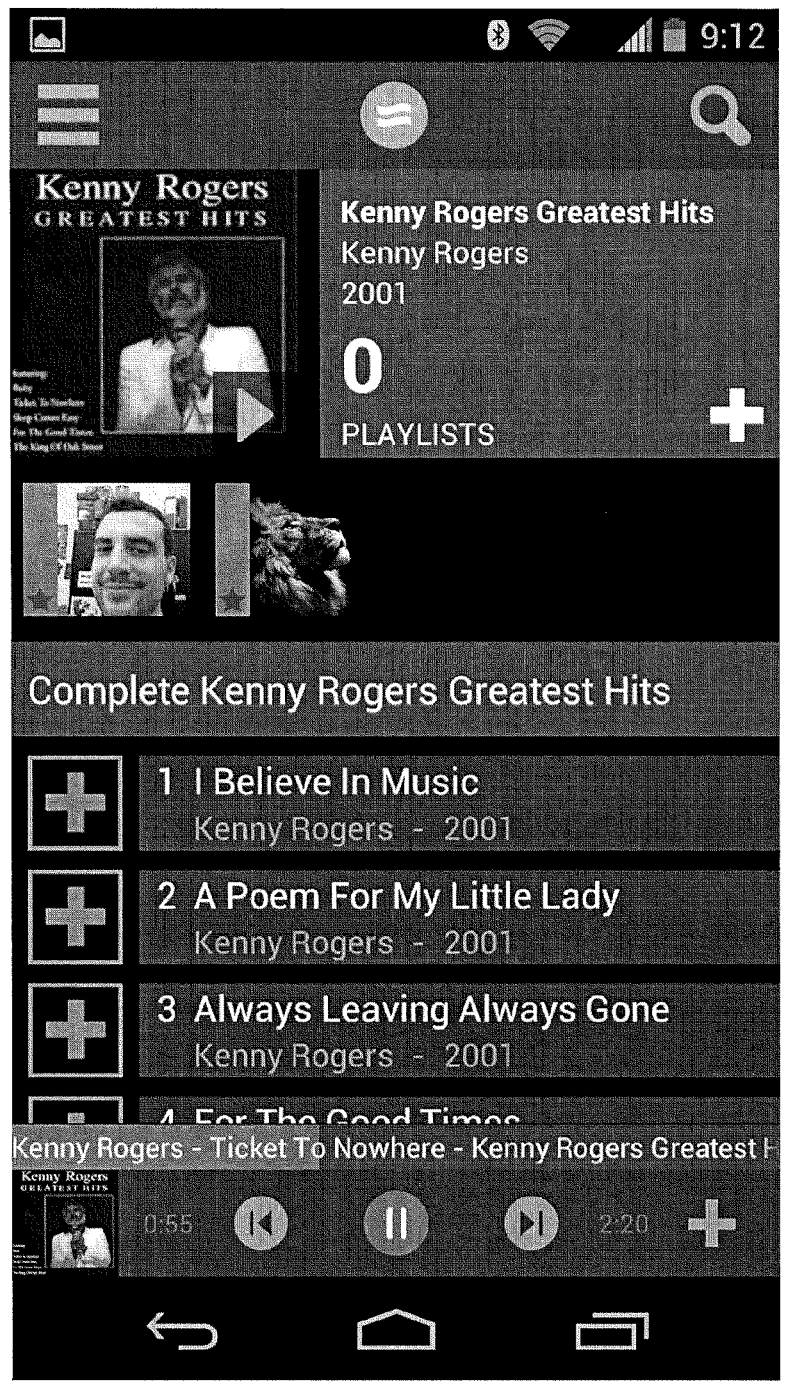

FIG. 3E shows that one song from a given album may be playing while the user is viewing other songs from the same album that are available for downloading.

Figure 3F:
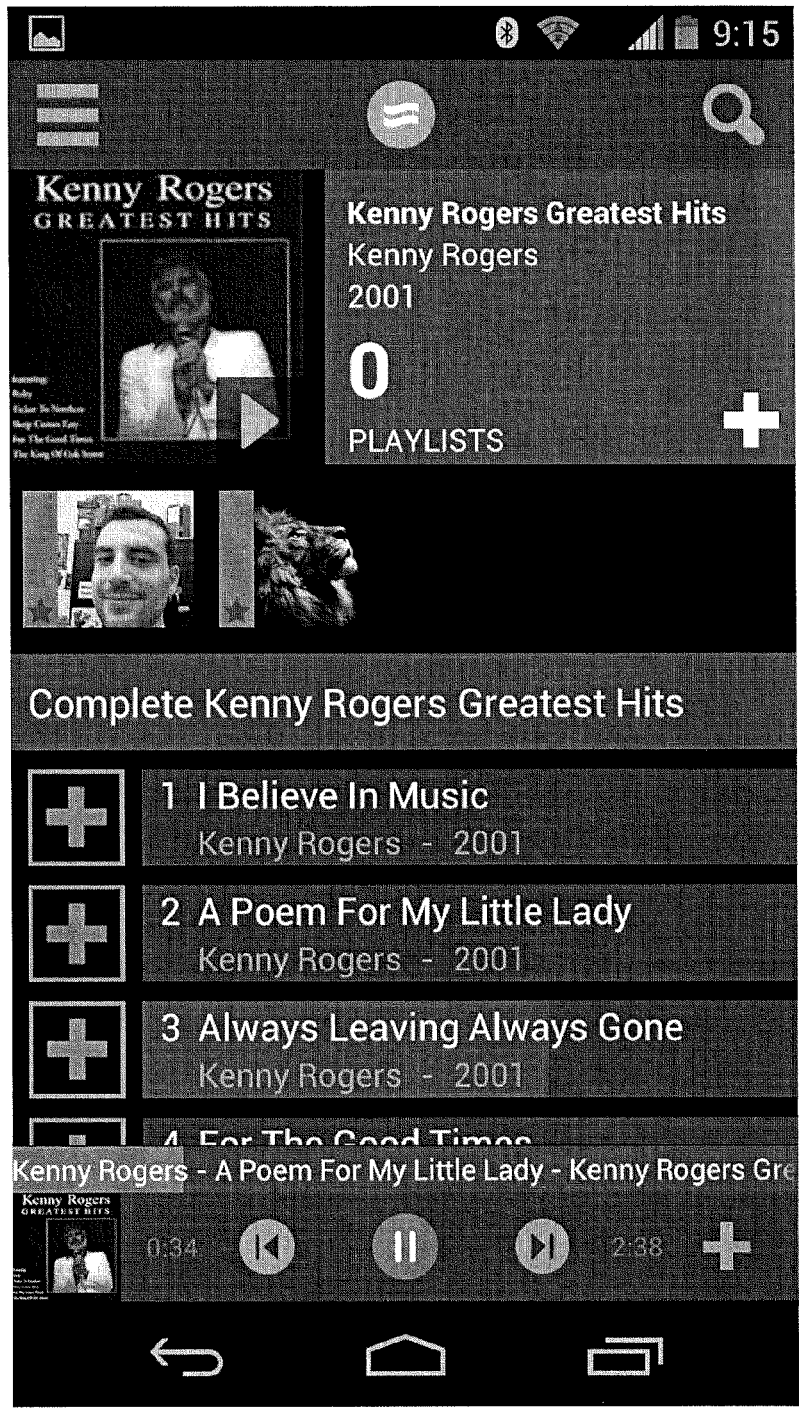

FIG. 3F is an example screenshot that shows that one song that has been downloaded can be played while another track from the same album is downloading in the background. Here, track 2 has been downloaded to temporary storage, which may be indicated with a blue plus sign next to track 2 as compared to a gray plus sign next to track 1 (which has not been downloaded previously) and a gray plus sign next to track 3 (which is currently being progressively downloaded, and which is playing currently as shown by the play progress bar near the bottom of the screen. The download status of track 3 is also shown by a progress bar.

Figure 3G:
Figure 3H:
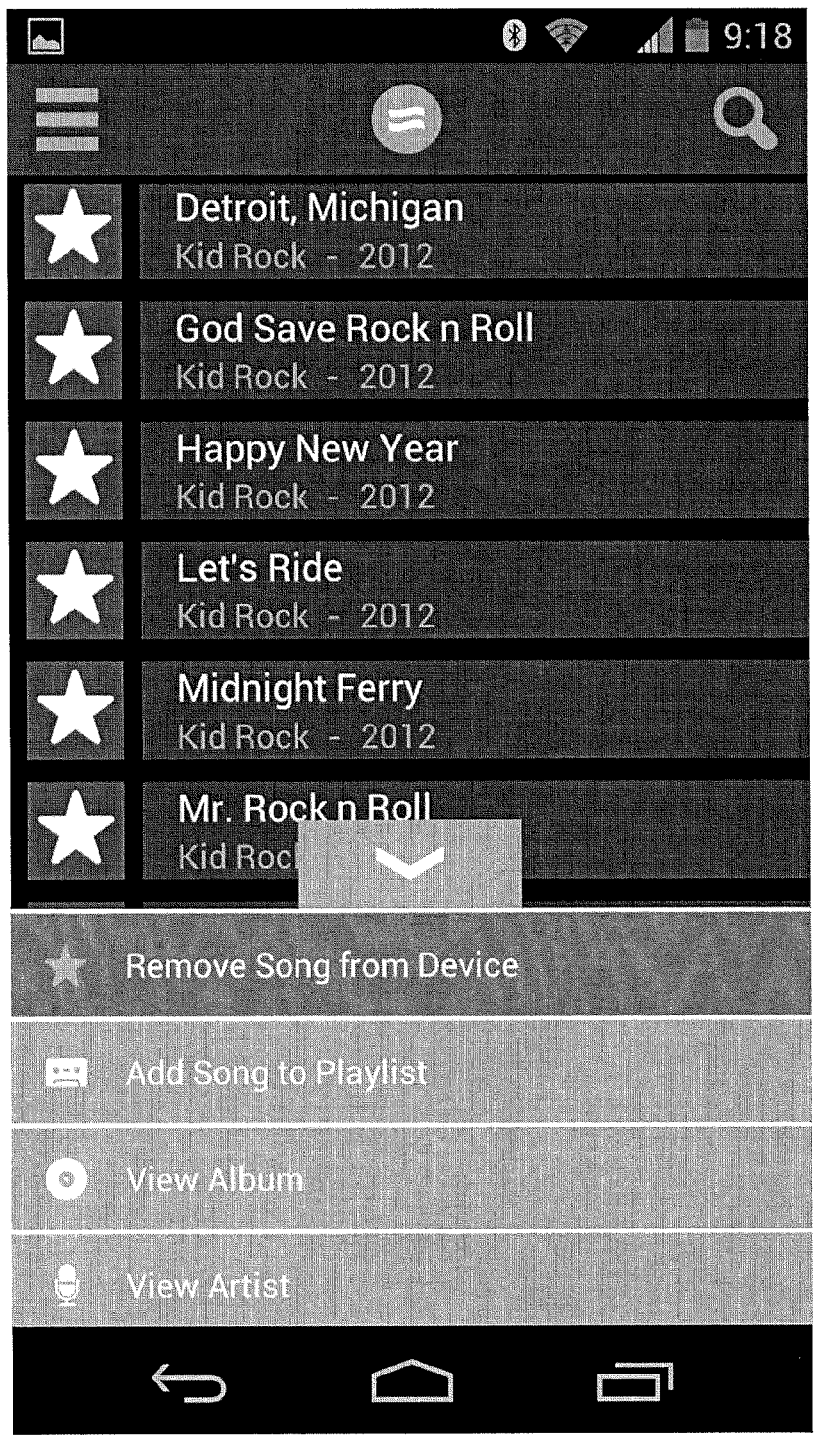

FIG. 3G is an example screenshot showing that after track 3 has finished downloading, it is designated with a blue plus sign, just like tracks 2 and 4 which are also stored in temporary storage in memory component 240.

FIG. 3H shows that when tracks have been designated by the user for permanent storage in memory component 240, they may be indicated with a different icon (in this example, a star) than when the tracks have been temporarily stored or not stored at all in memory component 240. FIG. 3H also shows that user may remove permanently stored tracks from mobile device 110. Hence, "permanently" stored does not necessarily mean stored for the life of the device, as the user can control the data that is stored on the device.

Figure 3I:
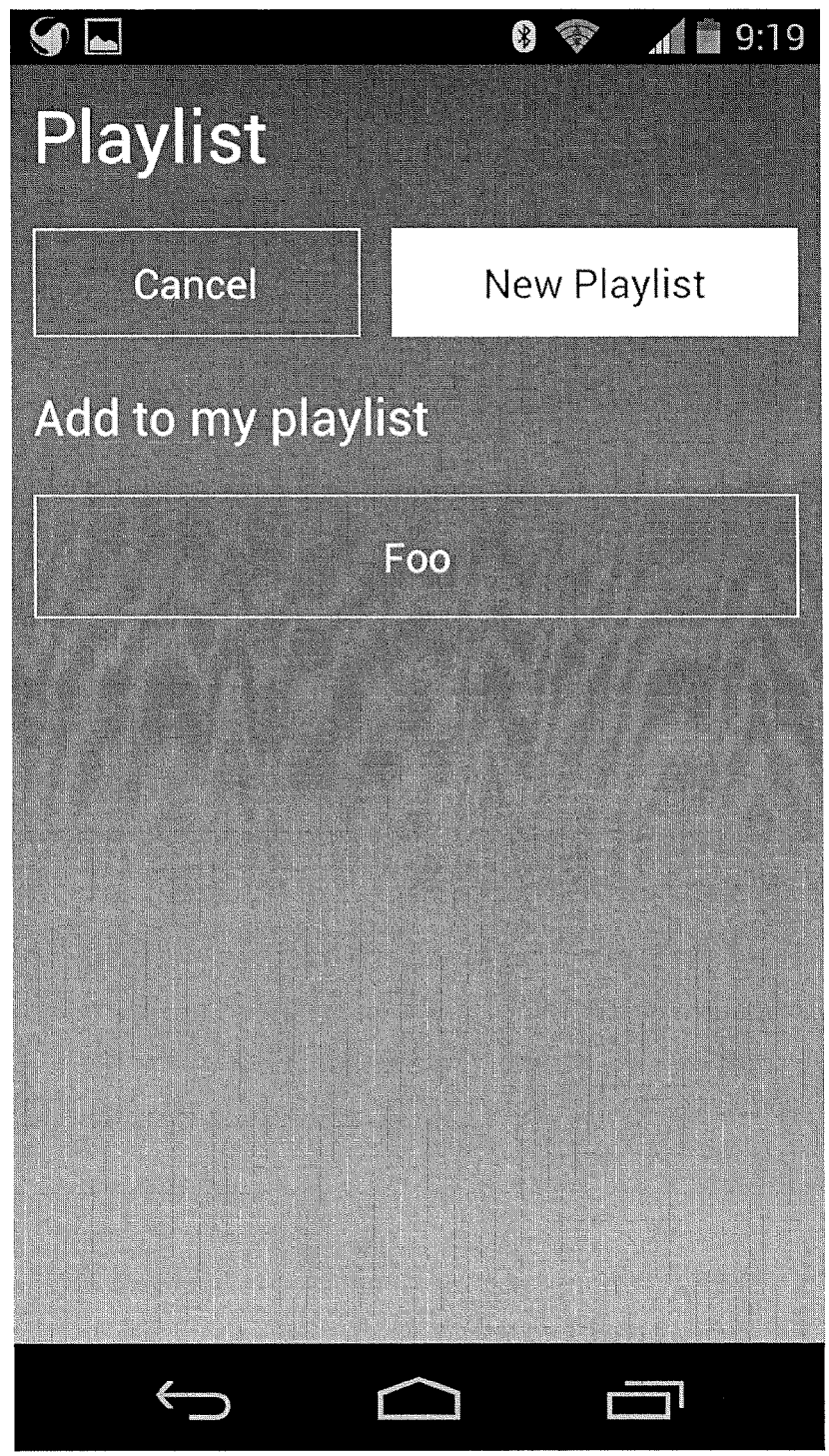

FIG. 3I shows a screen for adding a track to a playlist, as described earlier.

Figure 3J:
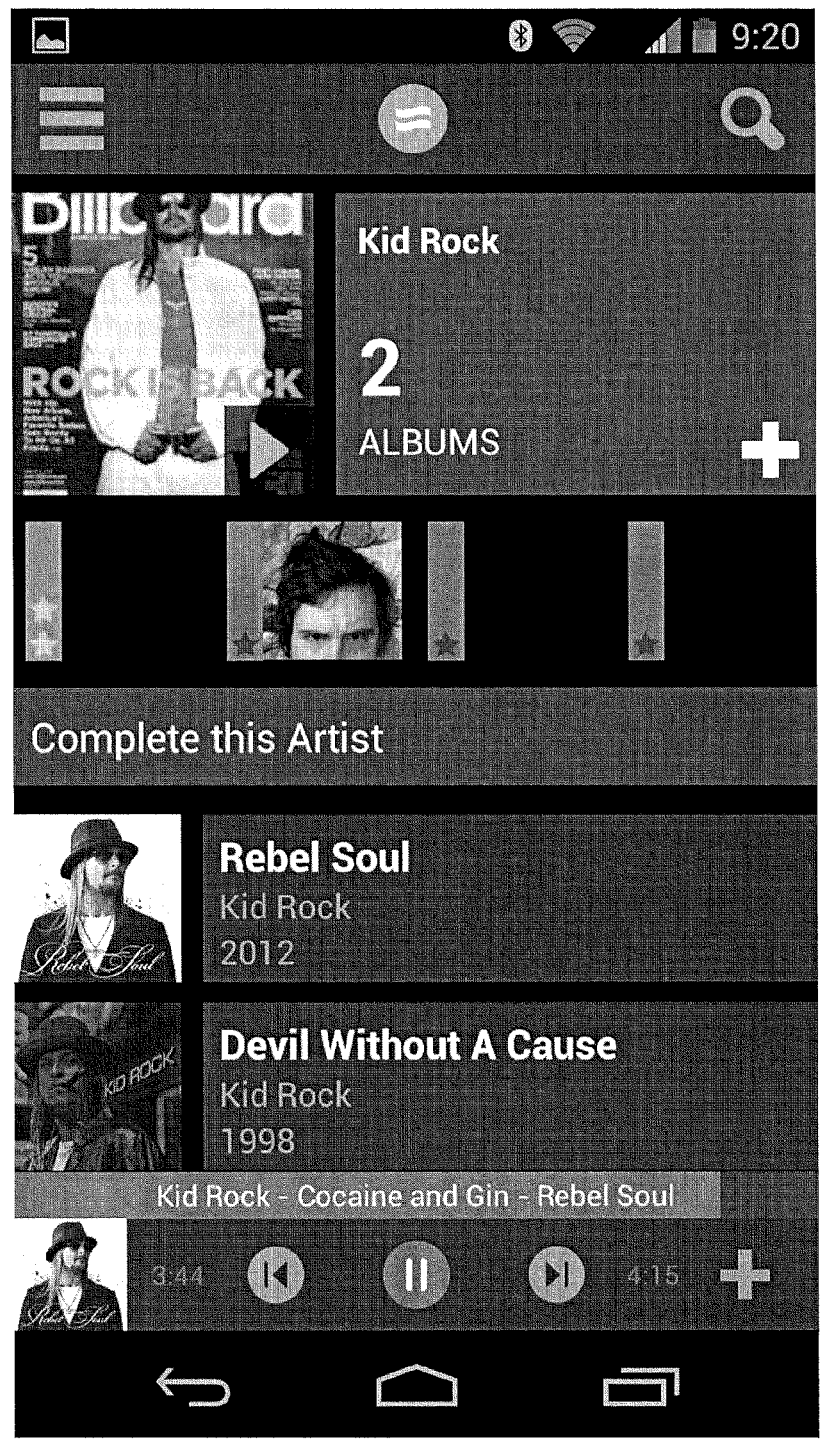

FIG. 3J shows that just as an album may be completed (see FIG. 3D above), an artist, too, may be completed such that all the tracks in the listed albums by the artist are downloaded to permanent storage in memory component 240.

Figure 3K:
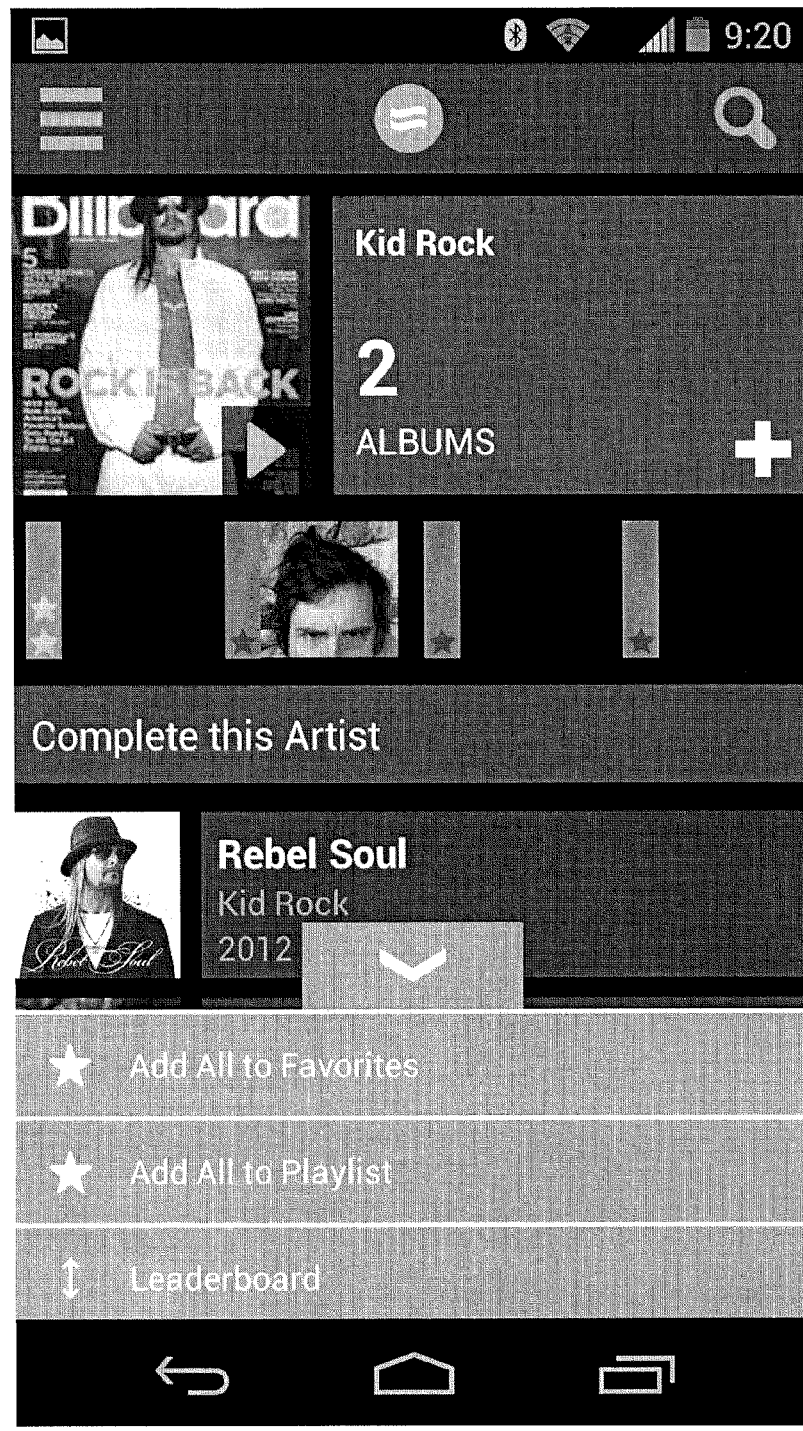

FIG. 3K shows the result of pressing the plus (+) symbol displayed at the lower right corner of the screen in FIG. 3J. All of the tracks in the listed albums by the presently displayed artist may be added to favorites (i.e., marked for permanent storage) or added to a playlist.

Figure 5:
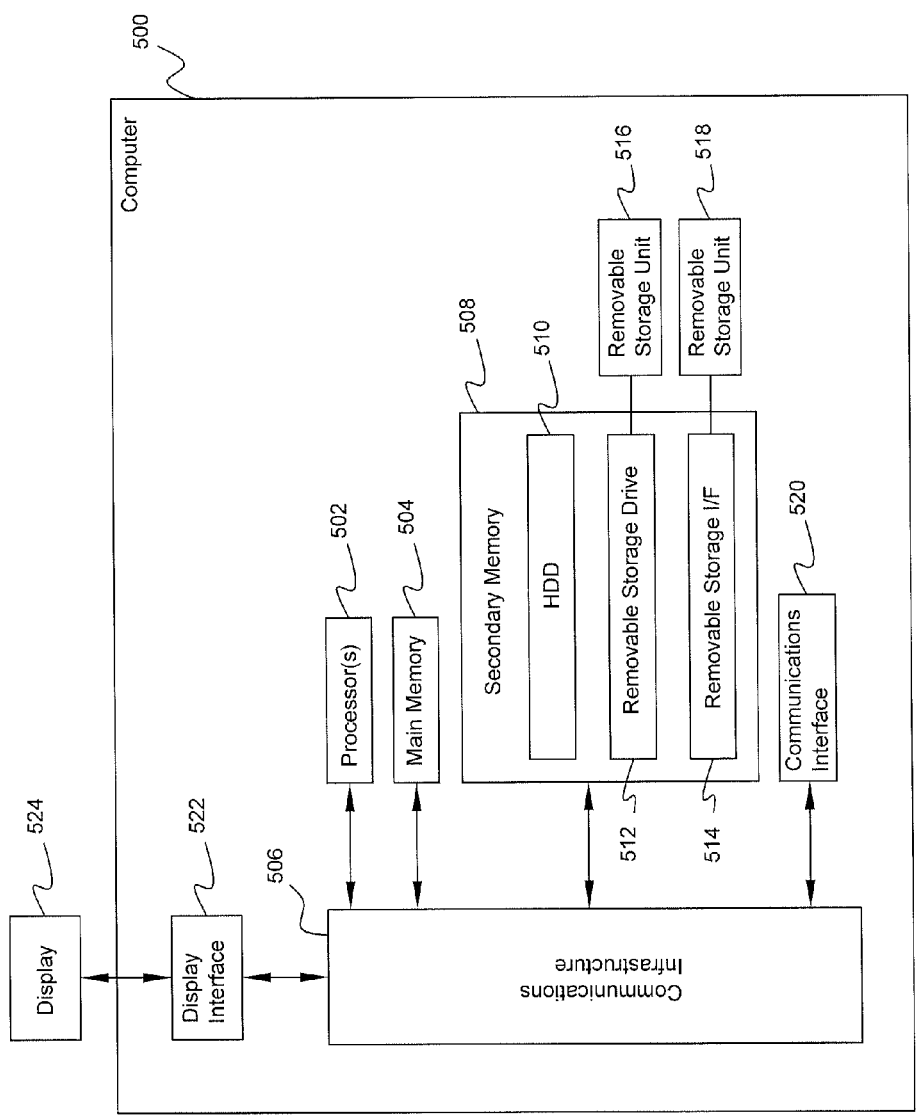
FIG. 5 is a block diagram of a server in accordance with certain embodiments.

FIG. 5 is a block diagram of an example architecture for a server (e.g., server 130) in accordance with certain embodiments. Computer system 500 may include one or more processors 502. Each processor 502 is connected to a communication infrastructure 506 (e.g., a communications bus, cross-over bar, or network). Computer system 500 may include a display interface 522 that forwards graphics, text, and other data from the communication infrastructure 506 (or from a frame buffer, not shown) for display on the display unit 524.

Computer system 500 may also include a main memory 504, such as a random access memory (RAM), and a secondary memory 508. The secondary memory 508 may include, for example, a hard disk drive (HDD) 510 and/or removable storage drive 512, which may represent a floppy disk drive, a magnetic tape drive, an optical disk drive, a memory stick, or the like as is known in the art. The removable storage drive 512 reads from and/or writes to a removable storage unit 516. Removable storage unit 516 may be a floppy disk, magnetic tape, optical disk, or the like. As will be understood, the removable storage unit 516 may include a computer readable storage medium having tangibly stored therein (embodied thereon) data and/or computer software instructions, e.g., for causing the processor(s) to perform various operations.

In alternative embodiments, secondary memory 508 may include other similar devices for allowing computer programs or other instructions to be loaded into computer system 500. Secondary memory 508 may include a removable storage unit 518 and a corresponding removable storage interface 514, which may be similar to removable storage drive 512, with its own removable storage unit 516. Examples of such removable storage units include, but are not limited to, USB or flash drives, which allow software and data to be transferred from the removable storage unit 516, 518 to computer system 500.

Computer system 500 may also include a communications interface 520. Communications interface 520 allows software and data to be transferred between computer system 500 and external devices. Examples of communications interface 520 may include a modem, Ethernet card, wireless network card, a Personal Computer Memory Card International Association (PCMCIA) slot and card, or the like. Software and data transferred via communications interface 520 may be in the form of signals, which may be electronic, electromagnetic, optical, or the like that are capable of being received by communications interface 520. These signals may be provided to communications interface 520 via a communications path (e g , channel), which may be implemented using wire, cable, fiber optics, a telephone line, a cellular link, a radio frequency (RF) link, WiFi™ and other communication channels.

In this document, the terms "computer program medium" and "non-transitory computer-readable storage medium" refer to media such as, but not limited to, media at removable storage drive 512, or a hard disk installed in hard disk drive 510, or removable storage unit 516. These computer program products provide software to computer system 500. Computer programs (also referred to as computer control logic) may be stored in main memory 504 and/or secondary memory 508. Computer programs may also be received via communications interface 520. Such computer programs, when executed by a processor, enable the computer system 500 to perform the features of the methods discussed herein. For example, main memory 504, secondary memory 508, or removable storage units 516 or 518 may be encoded with computer program code (instructions) for performing operations corresponding to various processes disclosed herein.

It is understood by those familiar with the art that the systems described herein may be implemented in hardware, firmware, or software encoded on a non-transitory computer-readable storage medium.

The systems and processes are not limited to the specific embodiments described herein. In addition, components of each system and each process can be practiced independent and separate from other components and processes described herein.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method for storing audio tracks on a wireless mobile device, the method comprising:
    running an application on the wireless mobile device to progressively download a first audio track based on at least one user preference over a wireless communication link with a remote network;
    wherein the remote network is configured to select a second audio track based on the at least one user preference and transmit the second audio track wirelessly to the mobile device without a user of the mobile device initiating the transmission of the second audio track such that the second audio track is playable when the mobile device is not wirelessly connected to the remote network;
    wherein the at least one user preference includes a first user preference that is inferred by the playing of the first audio track for at least a predetermined duration.

2. The method of claim 1, wherein the second audio track is transmitted to the mobile device while the first audio track is being downloaded to, and played at, the mobile device.

3. The method of claim 1, wherein the at least one user preference includes an explicit user preference inputted by the user.

4. The method of claim 3, wherein the explicit user preference is inputted by the user during an onboarding process.

5. The method of claim 3, wherein the explicit user preference is a track request made by the user.

6. The method of claim 1, wherein the second audio track is from the same album as the first audio track.

7. The method of claim 1, wherein the at least one user preference further includes a second user preference that is inferred from a history of audio tracks played by the user.

8. The method of claim 1, wherein the second audio track is transmitted to the mobile device only while the mobile device is connected to a power source.

9. The method of claim 1, wherein the application is configured to:
    monitor a bandwidth of the wireless communication link; and
    disable or pause transmission of the second audio track to the mobile device if the bandwidth is less than a threshold.

10. A method for delivering audio tracks to a wireless mobile device, the method comprising:
    providing to a user of the wireless mobile device an application for receiving and playing audio tracks;
    wirelessly transmitting a first audio track to the mobile device based on at least one preference of the user;
    determining, remote from the application, a second audio track based on the at least one preference of the user; and
    wirelessly transmitting the second audio track to the mobile device without the user of the mobile device initiating the transmission of the second audio track such that the second audio track is playable by the application when the mobile device is not connected to a wireless network;
    wherein the at least one user preference includes an inferred user preference that is inferred by the playing of the first audio track for at least a predetermined duration.

11. The method of claim 10, wherein the second audio track is transmitted to the mobile device while the first audio track is being transmitted to, and played at, the mobile device.

12. The method of claim 10, wherein the application is configured to:
monitor a bandwidth of a wireless communication link; and
disable or pause transmission of the second audio track to the mobile device if the bandwidth is less than a threshold.

13. A mobile device comprising:
a transceiver capable of wireless communication with a remote network over a wireless communication link;
an audio output component;
a computer processor operatively coupled to control the transceiver and the audio output component;
one or more memory components operatively coupled to the processor; and
an application stored in the one or more memory components for processing and playing of digital audio, wherein when running, the application causes the processor to:
progressively download a first audio track based on at least one user preference over the communication link from the remote network; and
play at least a portion of the first audio track through the audio output component while progressively downloading the first audio track;
wherein the remote network is configured to select a second audio track based on the at least one user preference and transmit the second audio track wirelessly to the mobile device for storage in the one or more memory components without the user initiating the transmission of the second audio track such that the second audio track is playable when the mobile device is not wirelessly connected to the remote network;
wherein the at least one user preference includes an inferred user preference that is inferred by the playing of the first audio track for at least a predetermined duration.

14. The mobile device of claim 13, wherein the second audio track is transmitted to the mobile device while the first audio track is being downloaded, and played at, to the mobile device.

15. The mobile device of claim 13, wherein the application is configured to:
monitor a bandwidth of the wireless communication link; and
disable or pause transmission of the second audio track to the mobile device if the bandwidth is less than a threshold.

16. A system comprising:
a mobile device including:
a transceiver capable of wireless communication over a wireless communication link;
an audio output component;
a computer processor operatively coupled to control the transceiver and the audio output component;
one or more memory components operatively coupled to the processor; and
an application stored in the one or more memory components for processing and playing of digital audio, wherein when running, the application causes the processor to:
progressively download a first audio track based on at least one user preference over the communication link; and
play at least a portion of the first audio track through the audio output component while progressively downloading the first audio track; and
a remote network including:
one or more remote servers capable of wireless communication with the mobile device over the wireless communication link; and
one or more storage units containing audio data of a plurality of audio tracks;
wherein the remote network is configured to:
select a second audio track from the storage units based on the at least one user preference; and
transmit the second audio track wirelessly from the remote servers to the mobile device without a user of the mobile device initiating the transmission of the second audio track;
wherein the second audio track received at the mobile device is stored in the one or more memory components of the mobile device and playable when the mobile device is not wirelessly connected to the remote network, and wherein the at least one user preference includes an inferred user preference that is inferred by the playing of the first audio track for at least a predetermined duration.

17. The system of claim 16, wherein the second audio track is transmitted to the mobile device while the first audio track is being downloaded to, and played at, the mobile device.

18. The system of claim 16, wherein the application is configured to:
monitor a bandwidth of the wireless communication link; and
disable or pause transmission of the second audio track to the mobile device if the bandwidth is less than a threshold.

19. The method of claim 6, wherein the remote network is further configured to transmit to the mobile device all remaining audio tracks from the same album as the first audio track without the user initiating the transmission of the remaining audio tracks.

20. The method of claim 10, wherein the second audio track is from the same album as the first audio track.

21. The mobile device of claim 13, wherein the second audio track is from the same album as the first audio track.

22. The system of claim 16, wherein the second audio track is from the same album as the first audio track.

* * * * *